(12) United States Patent
Tsuchiya et al.

(10) Patent No.: US 11,374,525 B2
(45) Date of Patent: Jun. 28, 2022

(54) MOTOR DRIVING APPARATUS AND AIR CONDITIONER USING THE SAME

(71) Applicant: Mitsubishi Electric Corporation, Tokyo (JP)

(72) Inventors: Atsushi Tsuchiya, Tokyo (JP); Keisuke Uemura, Tokyo (JP); Kazunori Hatakeyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/281,043

(22) PCT Filed: Nov. 7, 2018

(86) PCT No.: PCT/JP2018/041371
§ 371 (c)(1),
(2) Date: Mar. 29, 2021

(87) PCT Pub. No.: WO2020/095390
PCT Pub. Date: May 14, 2020

(65) Prior Publication Data
US 2021/0359634 A1  Nov. 18, 2021

(51) Int. Cl.
*H02P 27/08* (2006.01)
*H02M 7/5387* (2007.01)
(Continued)

(52) U.S. Cl.
CPC ........ *H02P 27/08* (2013.01); *H02M 7/53871* (2013.01); *F24F 11/88* (2018.01); *H02P 5/74* (2013.01)

(58) Field of Classification Search
CPC ...... H02P 1/00; H02P 1/04; H02P 1/16; H02P 1/163; H02P 1/18; H02P 1/24; H02P 1/26;
(Continued)

(56) References Cited

FOREIGN PATENT DOCUMENTS

| CN | 105471360 B | * | 6/2018 | ............ B60T 13/166 |
| EP | 2903150 B1 | | 2/2020 | |

(Continued)

*Primary Examiner* — Antony M Paul
(74) *Attorney, Agent, or Firm* — Posz Law Group, PLC

(57) ABSTRACT

A motor driving apparatus for driving a motor, the apparatus being connected to the motor by first, second, and third connection lines respectively corresponding to first, second, and third phases, the apparatus including: an inverter converting direct-current voltage into three-phase alternating-current voltage by using first, second, and third switching element pairs respectively connected to the first, second, and third connection lines, and outputting the three-phase alternating-current voltage to the motor; a voltage detection circuit detecting a first voltage based on a potential difference between a potential of the first connection line and a reference potential; and a control unit calculating a voltage value of the direct-current voltage based on the first voltage during a first period in which an upper-arm switching element of the first switching element pair is on, controlling operation of the inverter according to the voltage value, and changing the first period according to the voltage value.

10 Claims, 17 Drawing Sheets

(51) Int. Cl.
*F24F 11/88* (2018.01)
*H02P 5/74* (2006.01)

(58) Field of Classification Search
CPC .... H02P 1/42; H02P 1/46; H02P 1/465; H02P 3/00; H02P 6/00; H02P 6/005; H02P 6/12; H02P 6/15; H02P 6/28; H02P 6/32; H02P 9/00; H02P 11/00; H02P 21/00; H02P 21/22; H02P 21/24; H02P 21/50; H02P 23/00; H02P 23/14; H02P 21/14; H02P 25/062; H02P 25/064; H02P 27/00; H02P 27/04; H02P 27/06; H02P 29/00
See application file for complete search history.

(56) References Cited

FOREIGN PATENT DOCUMENTS

| | | |
|---|---|---|
| JP | 2006-006038 A | 1/2006 |
| JP | 2006-136037 A | 5/2006 |
| JP | 5590179 B2 | 8/2014 |

\* cited by examiner

MOTOR DRIVING APPARATUS AND AIR CONDITIONER USING THE SAME

CROSS REFERENCE TO RELATED APPLICATION

This application is a U.S. national stage application of International Patent Application No. PCT/JP2018/041371 filed on Nov. 7, 2018, the disclosure of which is incorporated herein by reference.

TECHNICAL FIELD

The present invention relates to a motor driving apparatus including a power conversion device and to an air conditioner using the motor driving apparatus.

BACKGROUND

Conventionally, in a power conversion device and a motor driving apparatus including a power conversion device, a direct-current voltage detection circuit detects, on the input side of an inverter that is the power conversion device, a direct-current bus voltage to be input to the inverter. In the direct-current voltage detection circuit, current flows regardless of operation of the inverter and thus, power is consumed even when the inverter is not operating. Accordingly, wasteful standby power has been generated. In order to reduce such standby power, Patent Literature 1 discloses a power consumption reduction apparatus that reduces power consumption by using a switching element to switch a current flow and reduce current flowing through a voltage detection circuit when the driving of an inverter is stopped.

PATENT LITERATURE

Patent Literature 1: Japanese Patent No. 5590179

However, the power consumption reduction apparatus described in Patent Literature 1 has a problem in that the apparatus becomes larger in circuit scale because a switching element is used to switch a current flow. Furthermore, the power consumption reduction apparatus described in Patent Literature 1 uses a method of reducing power consumption by turning on the switching element to cause current to detour when the driving of the inverter is stopped. Therefore, the power consumption reduction apparatus described in Patent Literature 1 has a problem in that standby power is generated because current flows through part of a voltage-dividing resistor even when the driving of the inverter is stopped.

SUMMARY

The present invention has been made in view of the above, and an object of the present invention is to achieve a motor driving apparatus capable of reducing standby power without increasing the size of the apparatus.

In order to solve the above-described problems and achieve the object, the present invention is a motor driving apparatus for driving a motor, the motor driving apparatus being connected to the motor by a first connection line, a second connection line, and a third connection line, the first connection line, the second connection line, and the third connection line respectively corresponding to a first phase, a second phase, and a third phase. The motor driving apparatus includes an inverter including a first switching element pair, a second switching element pair, and a third switching element pair respectively connected to the first connection line, the second connection line, and the third connection line, each of the first switching element pair, the second switching element pair, and the third switching element pair including an upper-arm switching element and a lower-arm switching element, the inverter converting a direct-current voltage into a three-phase alternating-current voltage by using the first switching element pair, the second switching element pair, and the third switching element pair and outputting the three-phase alternating-current voltage to the motor. In addition, the motor driving apparatus includes a voltage detection circuit that detects a first voltage, the first voltage being based on a potential difference between a potential of the first connection line and a reference potential; and a control unit that calculates a voltage value of the direct-current voltage on the basis of the first voltage during a first period, controls an operation of the inverter in accordance with the voltage value, and changes the first period in accordance with the voltage value, the upper-arm switching element of the first switching element pair being in an on-state during the first period.

The motor driving apparatus according to the present invention has the effect of enabling standby power to be reduced without increasing the size of the apparatus.

DETAILED DESCRIPTION

Hereinafter, a motor driving apparatus and an air conditioner using the same according to embodiments of the present invention will be described in detail with reference to the drawings. Note that the present invention is not limited to the embodiments.

First Embodiment

Figure 1:
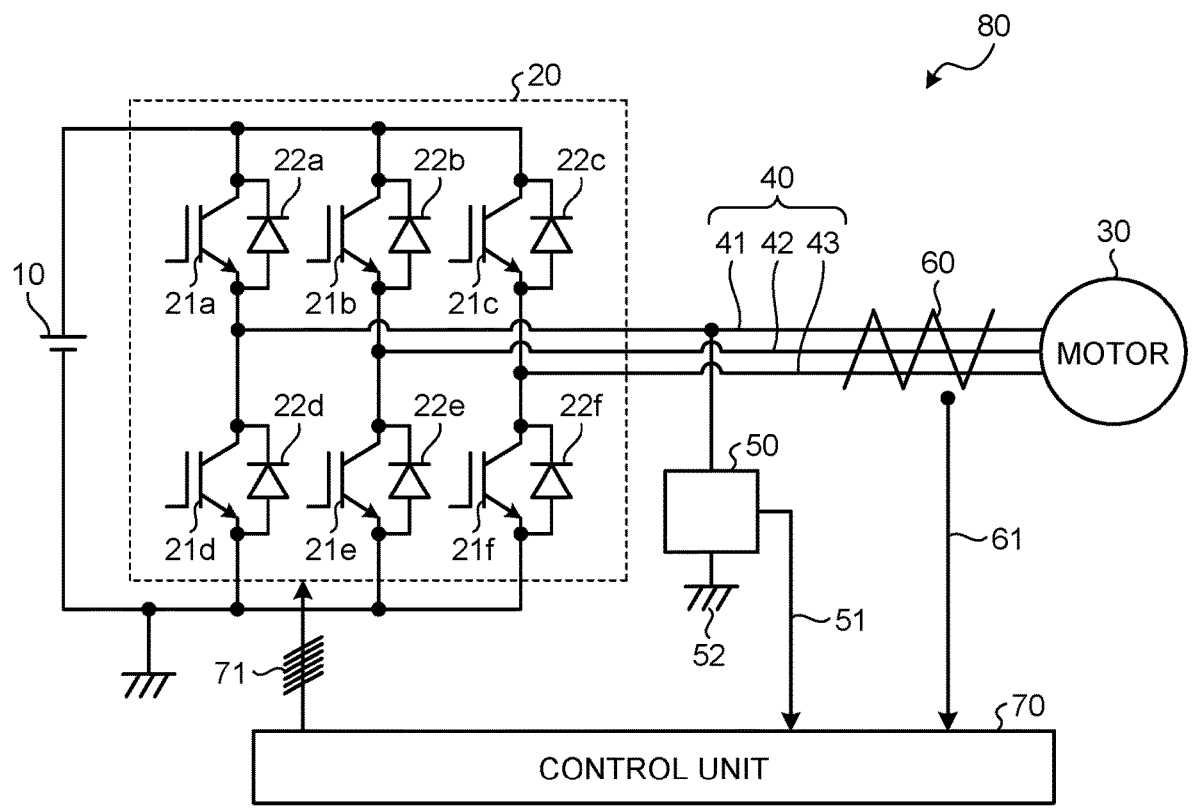
FIG. 1 is a diagram illustrating an example configuration of a motor driving apparatus according to a first embodiment.

FIG. 1 is a diagram illustrating an example configuration of a motor driving apparatus 80 according to a first embodiment of the present invention. The motor driving apparatus 80 includes a direct-current power source 10, an inverter 20, a motor 30, a connection line group 40, a voltage detection circuit 50, a current detection circuit 60, and a control unit 70.

The direct-current power source 10 supplies a direct-current voltage, that is, a direct-current bus voltage to the inverter 20. The direct-current power source 10 may be a converter that converts an alternating-current voltage output from an external alternating-current power source (not illustrated) into a direct-current voltage. In this case, a capacitor may be provided between the converter and the inverter 20. A electrolytic capacitor that is generally used or a film capacitor that is a long-life capacitor may be used as the capacitor. Moreover, it is also possible to adopt a configuration for reducing harmonic current in current flowing through the alternating-current power source, by using a capacitor having a small capacitance. Furthermore, a reactor may be inserted between the converter and the capacitor, for the purpose of reducing harmonic current and improving a power factor.

The inverter 20 is a power conversion device including switching elements 21a to 21f and diodes 22a to 22f. The diodes 22a to 22f are backflow prevention diodes arranged in parallel with the switching elements 21a to 21f, respectively. In the inverter 20, the switching elements 21a to 21c are upper-arm switching elements, and the switching elements 21d to 21f are lower-arm switching elements. The switching element 21a and the switching element 21d form a U-phase switching element pair. The switching element 21b and the switching element 21e form a V-phase switching element pair. The switching element 21c and the switching element 21f form a W-phase switching element pair. In this manner, the inverter 20 includes three switching element pairs. In the inverter 20, the switching elements 21a to 21f are turned on and off on the basis of gate signals 71 that are instructions to be issued from the control unit 70 to the switching elements 21a to 21f. As a result, the inverter 20 converts the direct-current voltage, that is, the direct-current bus voltage into a three-phase alternating-current voltage, and outputs the three-phase alternating-current voltage to the motor 30. Note that in the case where the switching elements 21a to 21f are not distinguished from each other, the switching elements 21a to 21f may be referred to as switching elements 21, and when the diodes 22a to 22f are not distinguished from each other, the diodes 22a to 22f may be referred to as diodes 22.

The motor 30 is driven by the three-phase alternating-current voltage output from the inverter 20. The motor 30 is, for example, a permanent magnet (PM) motor.

The connection line group 40 includes three connection lines that are connected to the motor 30 and supply, to the motor 30, the three-phase alternating-current voltage output from the inverter 20. The connection line group 40 includes a first connection line 41. One end of the first connection line 41 is connected to the midpoint of the U-phase switching element pair of the inverter 20, and the opposite end of the first connection line 41 is connected to a U-phase terminal (not illustrated) of the motor 30. Furthermore, the connection line group 40 includes a second connection line 42. One end of the second connection line 42 is connected to the midpoint of the V-phase switching element pair of the inverter 20, and the opposite end of the second connection line 42 is connected to a V-phase terminal (not illustrated) of the motor 30. Moreover, the connection line group 40 includes a third connection line 43. One end of the third connection line 43 is connected to the midpoint of the W-phase switching element pair of the inverter 20, and the opposite end of the third connection line 43 is connected to a W-phase terminal (not illustrated) of the motor 30. Note that in the example of FIG. 1, the U phase is regarded as a first phase, the V phase is regarded as a second phase, and the W phase is regarded as a third phase.

The voltage detection circuit 50 is a voltage detection unit provided on the output side of the inverter 20, that is, between the inverter 20 and the motor 30, and connected to the first connection line 41 and a ground 52. The voltage detection circuit 50 detects a voltage based on a potential difference between the potential of the first connection line 41 and a reference potential, and outputs a first voltage, which is a value of the detected voltage, as a voltage detection result 51 to the control unit 70. In the example of FIG. 1, the ground 52 serves as the reference potential.

The current detection circuit 60 is a current detection unit provided on the output side of the inverter 20, that is, between the inverter 20 and the motor 30, and connected to at least one of the connection lines in the connection line group 40. The current detection circuit 60 detects currents flowing through the connection line group 40, and outputs the values of the detected currents as current detection results 61 to the control unit 70.

The control unit 70 is a microcontroller that controls the operation of the inverter 20. Specifically, the control unit 70 determines the voltage value of the three-phase alternating-current voltage to be output from the inverter 20 on the basis of the voltage detection result 51 and the current detection results 61, and determines the switching timing of the switching elements 21a to 21f of the inverter 20 such that the determined voltage value of the three-phase alternating-current voltage is output from the inverter 20. The control unit 70 generates the gate signals 71 for controlling on and off of the switching elements 21a to 21f so that the switching elements 21a to 21f are driven at the determined switching timing, and outputs the gate signals 71 to the inverter 20.

In the motor driving apparatus 80, the inverter 20 is driven under the control of the control unit 70, converts a direct-current voltage into a three-phase alternating-current voltage, and outputs the three-phase alternating-current voltage to the motor 30. As a result, an appropriate rotating magnetic field is generated and accordingly, the motor 30 rotates.

Figure 2:
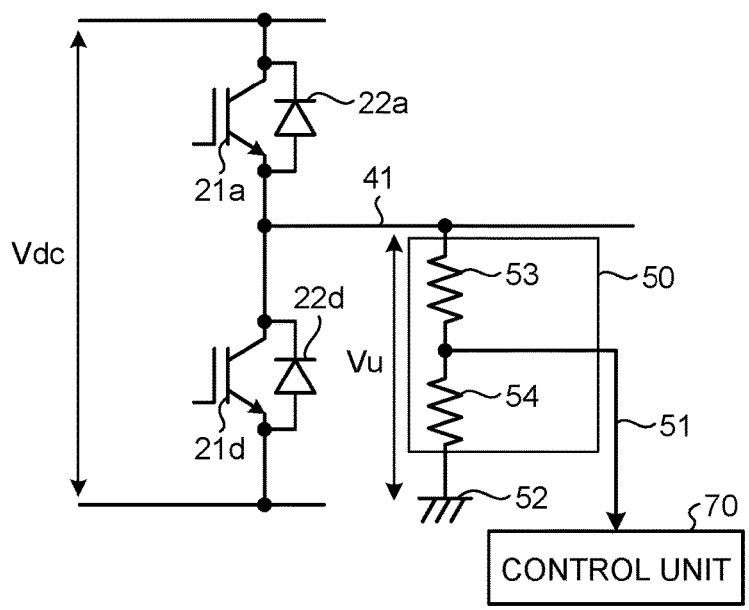
FIG. 2 is a diagram illustrating an example configuration of a voltage detection circuit included in the motor driving apparatus according to the first embodiment.

Next, a description will be given of operation in which the voltage detection circuit 50 detects the first voltage and the control unit 70 calculates the voltage value of the direct-current bus voltage in the motor driving apparatus 80. FIG. 2 is a diagram illustrating an example configuration of the voltage detection circuit 50 included in the motor driving apparatus 80 according to the first embodiment. FIG. 2 illustrates an extracted part of the motor driving apparatus 80 illustrated in FIG. 1, the part relating to the operation of detection of the first voltage to be performed by the voltage detection circuit 50. The voltage detection circuit 50 includes a voltage-dividing resistor including a resistor 53 and a resistor 54. Note that resistance values of the resistor 53 and the resistor 54 are set as follows: resistance value R1 of resistor 53>resistance value R2 of resistor 54. In FIG. 2, Vdc denotes the direct-current bus voltage input from the direct-current power source 10 to the inverter 20, and Vu denotes the potential difference between the ground 52 and the first connection line 41, that is, a phase voltage to be applied to the U phase.

Figure 3:
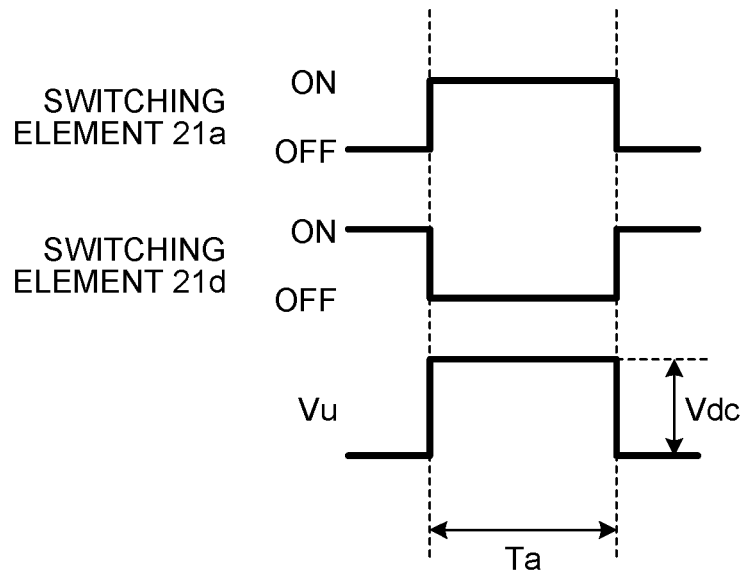
FIG. 3 is a diagram illustrating the on/off timing of switching elements included in an inverter of the motor driving apparatus according to the first embodiment and a detection period in which the voltage detection circuit detects a first voltage.

FIG. 3 is a diagram illustrating the on/off timing of the switching elements 21a and 21d included in the inverter 20 of the motor driving apparatus 80 according to the first embodiment and a detection period Ta in which the voltage detection circuit 50 detects a first voltage. The detection period Ta is a period in which the switching element 21a, which is the upper-arm switching element of the U phase, is in an on-state and the switching element 21d, which is the lower-arm switching element of the U phase, is in an off-state. In the detection period Ta, the phase voltage Vu, which is applied from the ground 52 to the U phase, is equal to the direct-current bus voltage Vdc. The voltage detection circuit 50 outputs a first voltage V1, which is a voltage across the resistor 54, as the voltage detection result 51 to the control unit 70. Note that the detection period Ta may be referred to as a first period.

The control unit 70 holds in advance information on the resistance value R1 of the resistor 53, the resistance value R2 of the resistor 54, and a calculation formula of the direct-current bus voltage Vdc. Furthermore, since the control unit 70 outputs the gate signals 71 to the inverter 20, the control unit 70 recognizes the on/off timing of the switching elements 21a to 21f included in the inverter 20. Therefore, the control unit 70 uses the first voltage V1 acquired from the voltage detection circuit 50 in the detection period Ta to calculate the phase voltage Vu on the basis of the calculation formula "V1×((R1+R2)/R2)=Vu". The control unit 70 can calculate the voltage value of the phase voltage Vu, that is, the direct-current bus voltage Vdc by using the first voltage V1 since the phase voltage Vu is equal to the direct-current bus voltage Vdc in the detection period Ta. In the following description, the voltage value of the direct-current bus voltage Vdc may be simply referred to as the direct-current bus voltage Vdc for the sake of brevity.

Figure 4:
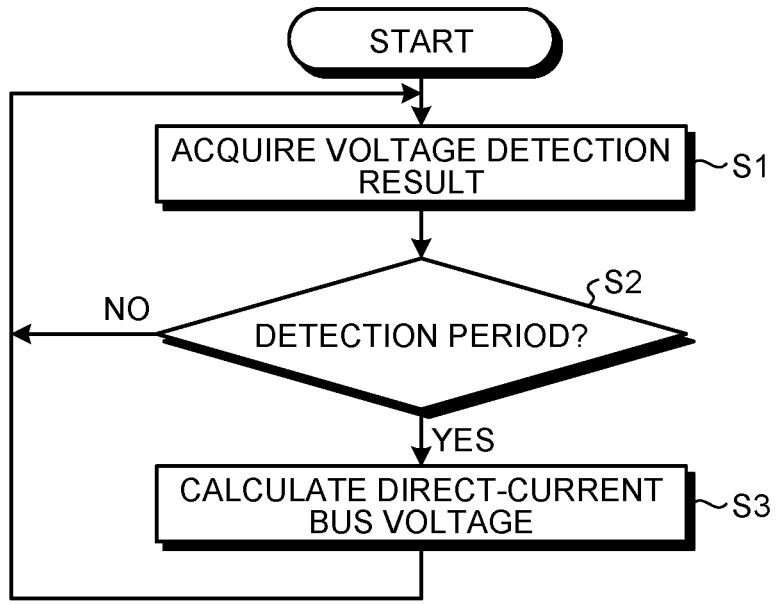
FIG. 4 is a flowchart illustrating a direct-current bus voltage calculation process to be performed in a control unit of the motor driving apparatus according to the first embodiment.

FIG. 4 is a flowchart illustrating a process of calculating the direct-current bus voltage Vdc in the control unit 70 of the motor driving apparatus 80 according to the first embodiment. The control unit 70 acquires the voltage detection result 51 from the voltage detection circuit 50 (step S1). The control unit 70 determines whether the detection period Ta has arrived on the basis of the gate signals 71 output to the inverter 20 (step S2). When the detection period Ta has arrived (step S2: Yes), the control unit 70 calculates the direct-current bus voltage Vdc (step S3), and returns to step S1. When the detection period Ta has not arrived (step S2: No), the control unit 70 returns to step S1.

As illustrated in FIGS. 1 and 2, the voltage detection circuit 50 is provided on the output side of the inverter 20 in the motor driving apparatus 80. Therefore, when the inverter 20 is not operating, no current flows through the voltage detection circuit 50. That is, unless the control unit 70 outputs the gate signals 71 to the inverter 20, no voltage is generated on the output side of the inverter 20, so that no current flows through the voltage detection circuit 50. A current flows to the voltage detection circuit 50 only when the inverter 20 is operating. In a standby state where the inverter 20 is not operating, no current flows to the voltage detection circuit 50, so that the voltage detection circuit 50 does not consume power. That is, standby power is not generated in the voltage detection circuit 50 in the standby state where the inverter 20 is not operating in the motor driving apparatus 80. Therefore, the motor driving apparatus 80 can reduce standby power as compared with a motor driving apparatus of a comparative example in which a circuit that detects a direct-current bus voltage is provided on the input side of an inverter.

Here, the detection period Ta, in which the voltage detection circuit 50 can detect the first voltage based on the direct-current bus voltage Vdc, changes depending on the magnitude of the three-phase alternating-current voltage output by the inverter 20. Specifically, the larger the three-phase alternating-current voltage output from the inverter 20 is, the shorter the detection period Ta is in which the voltage detection circuit 50 can detect the first voltage based on the direct-current bus voltage Vdc. When the detection period Ta is reduced, a period in which the control unit 70 can calculate the direct-current bus voltage Vdc is reduced. Therefore, the control unit 70 changes the detection period Ta according to the magnitude of the three-phase alternating-current voltage output by the inverter 20, that is, a voltage modulation factor of the inverter 20.

Figure 5:
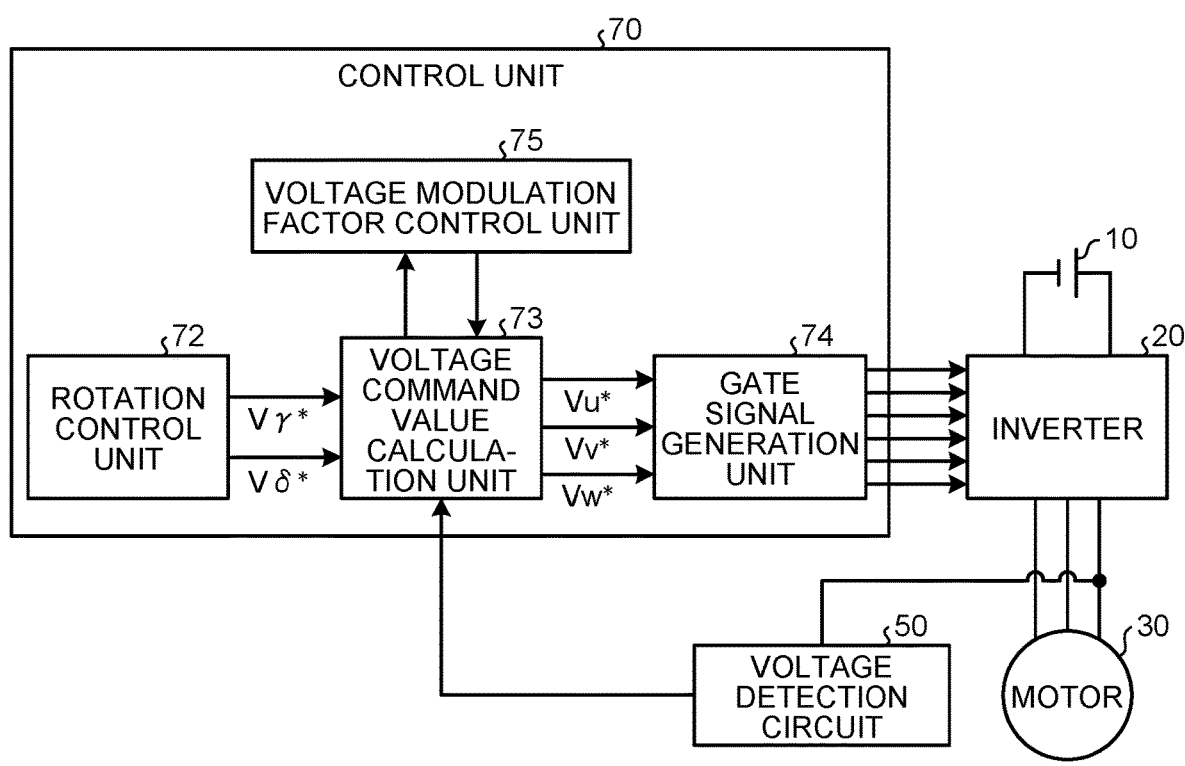
FIG. 5 is a diagram illustrating an example configuration of the control unit of the motor driving apparatus according to the first embodiment.

FIG. 5 is a diagram illustrating an example configuration of the control unit 70 of the motor driving apparatus 80 according to the first embodiment. The control unit 70 includes a rotation control unit 72, a voltage command value calculation unit 73, a gate signal generation unit 74, and a voltage modulation factor control unit 75. In the present embodiment, a case where the control unit 70 controls the operation of the inverter 20 by using a pulse width modulation (PWM) method will be specifically described, but a control method to be used by the control unit 70 in controlling the inverter 20 is not limited thereto.

The rotation control unit 72 generates and outputs a γ-axis voltage command Vγ* for a main shaft and a δ-axis voltage command Vδ* for a lay shaft in response to a rotation speed command. The rotation speed command is based on, for example, details of a user's operation on an air conditioner in the case where the motor driving apparatus 80 is installed in the air conditioner. When the user operates a remote control or the like to set a temperature or the like for the air conditioner, a control device (not illustrated) that controls operation of the air conditioner receives setting details from the remote control, generates a rotation speed command according to the setting details, and outputs the rotation speed command to the rotation control unit 72.

The voltage command value calculation unit 73 calculates the phase voltage Vu, that is, the direct-current bus voltage Vdc by using the first voltage V1 acquired from the voltage detection circuit 50 in the detection period Ta. The direct-current bus voltage Vdc is calculated by the above-described method. The voltage command value calculation unit 73 calculates and outputs voltage command values Vu*, Vv*, and Vw* for three phases of the inverter 20 by using the γ-axis voltage command Vγ* and the δ-axis voltage command Vδ* acquired from the rotation control unit 72 and the calculated direct-current bus voltage Vdc. Note that Vu* denotes a voltage command value corresponding to the U phase, Vv* denotes a voltage command value corresponding to the V phase, and Vw* denotes a voltage command value corresponding to the W phase. Furthermore, the voltage command value calculation unit 73 corrects the voltage command values Vu*, Vv*, and Vw* calculated by use of the γ-axis voltage command Vγ*, the δ-axis voltage command Vδ*, and the direct-current bus voltage Vdc, on the basis of an instruction from the voltage modulation factor control unit 75.

The gate signal generation unit 74 uses the voltage command values Vu*, Vv*, and Vw* to generate the gate signals 71 (SWup, SWvp, SWwp, SWun, SWvn, and SWwn) for the switching elements 21*a* to 21*f* included in the inverter 20, and outputs the gate signals 71 to the inverter 20. Note that SWup denotes a gate signal for the switching element 21*a*, SWvp denotes a gate signal for the switching element 21*b*, SWwp denotes a gate signal for the switching element 21*c*, SWun denotes a gate signal for the switching element 21*d*, SWvn denotes a gate signal for the switching element 21*e*, and SWwn denotes a gate signal for the switching element 21*f*. Specifically, the gate signal generation unit 74 compares the voltage command values Vu*, Vv*, and Vw* with a carrier signal, and generates the gate signals 71 (SWup, SWvp, SWwp, SWun, SWvn, and SWwn) on the basis of the magnitude relationship between the voltage command values Vu*, Vv*, and Vw* and the carrier signal. In the motor driving apparatus 80, the gate signal generation unit 74 applies a voltage to the motor 30 by outputting the gate signals 71 to drive the switching elements 21*a* to 21*f* included in the inverter 20.

The voltage modulation factor control unit 75 uses the voltage command values Vu*, Vv*, and Vw* calculated by the voltage command value calculation unit 73 to calculate the voltage modulation factor of the three-phase alternating-current voltage output from the inverter 20 to the motor 30 and determine whether to change the detection period Ta. Specifically, the voltage modulation factor control unit 75 determines whether to correct the range of a zero vector to be used when the inverter 20 drives the motor 30.

Figure 6:
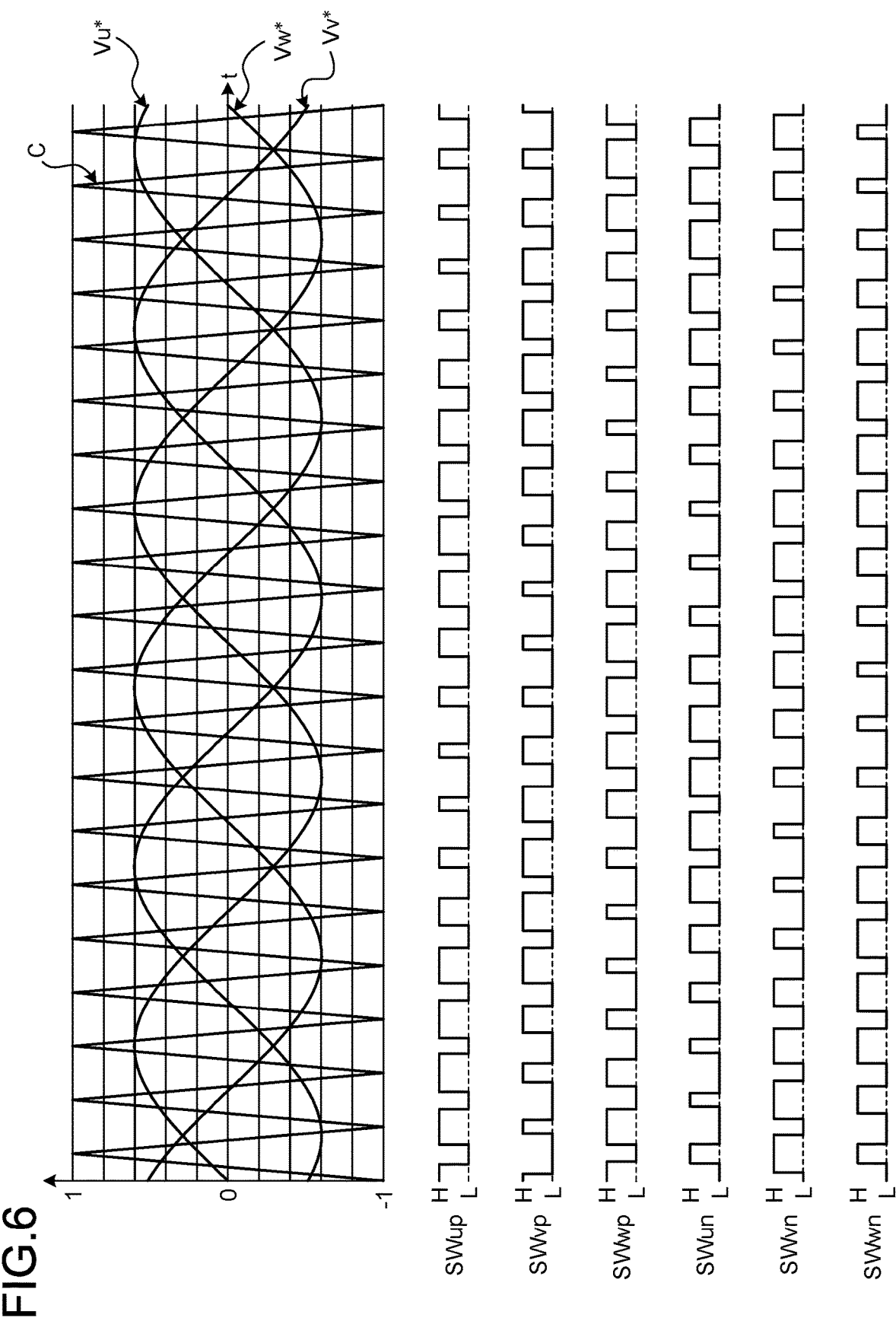
FIG. 6 is a diagram illustrating voltage command values and gate signals to be generated by the control unit of the motor driving apparatus according to the first embodiment.

FIG. 6 is a diagram illustrating the voltage command values Vu*, Vv*, and Vw* and the gate signals 71 to be generated by the control unit 70 of the motor driving apparatus 80 according to the first embodiment. As described above, the voltage command values Vu*, Vv*, and Vw* are generated by the voltage command value calculation unit 73, and the gate signals 71 (SWup, SWvp, SWwp, SWun, SWvn, and SWwn) are generated by the gate signal generation unit 74. The gate signal generation unit 74 compares the voltage command values Vu*, Vv*, and Vw* with a carrier signal C that is a triangular-wave carrier, and determines the switching timing of the switching elements 21*a* to 21*f* included in the inverter 20 according to the result of comparison. The switching elements 21*a* to 21*f* are turned on at the timing when the gate signals 71 (SWup, SWvp, SWwp, SWun, SWvn, and SWwn) illustrated in FIG. 6 are set to high (H), and are turned off at the timing when the gate signals 71 (SWup, SWvp, SWwp, SWun, SWvn, and SWwn) are set to low (L), respectively. In the inverter 20, the switching elements 21*a* to 21*f* are respectively turned on and off according to the gate signals 71 (SWup, SWvp, SWwp, SWun, SWvn, and SWwn) illustrated in FIG. 6. As a result, the inverter 20 outputs an alternating-current voltage of a desired frequency as a line voltage value by outputting voltages of 0 [v] and the direct-current bus voltage Vdc [v] per phase in a pulsed manner. Note that the case where the carrier signal C is a triangular wave has been described, but this is just an example, and the shape of the carrier signal is not limited as long as the carrier signal enables control with which an appropriate line voltage is output, such as that in the case of inverter operation based on space vector modulation.

Figure 7:
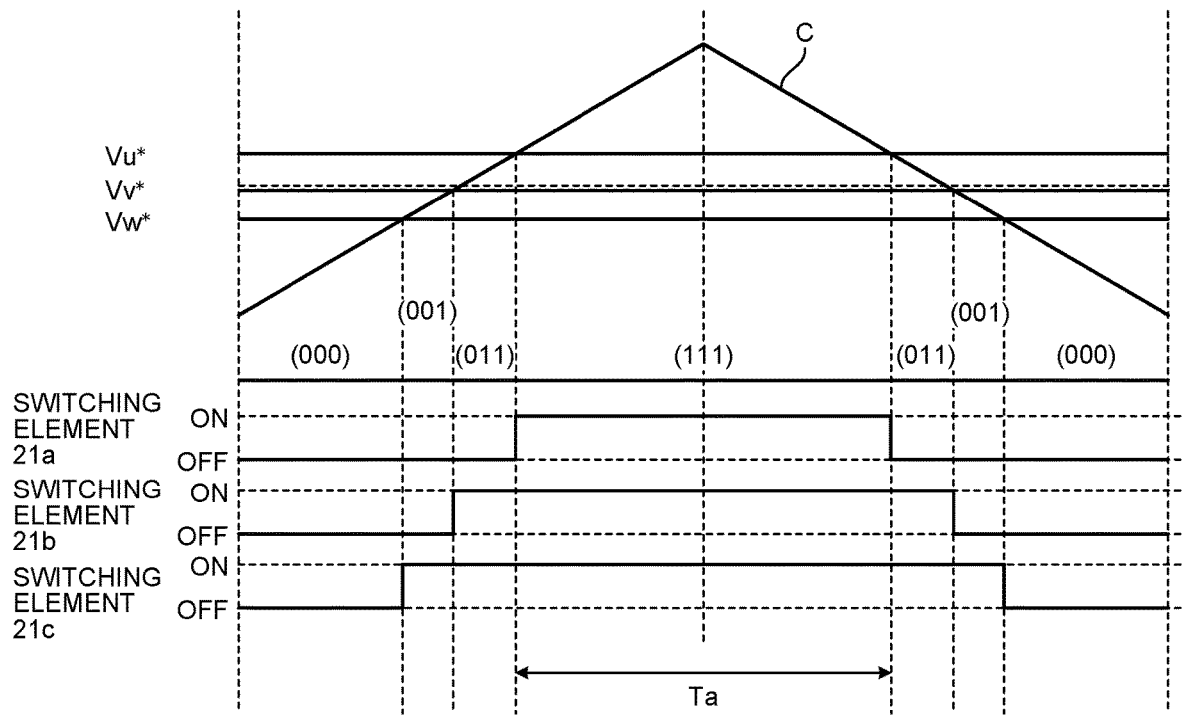
FIG. 7 is a diagram illustrating a detection period in which a direct-current bus voltage can be detected in the case where the voltage command values are small in amplitude in the motor driving apparatus according to the first embodiment.

FIG. 7 is a diagram illustrating the detection period Ta in which the direct-current bus voltage Vdc can be detected in the case where the voltage command values are small in amplitude in the motor driving apparatus 80 according to the first embodiment. When the voltage command values Vu*, Vv*, and Vw* are small in amplitude, that is, when an output voltage modulation factor is small, the respective upper-arm switching elements of the U phase, the V phase, and the W phase, that is, the switching elements 21*a* to 21*c* in the inverter 20 are in a state where a zero vector state is dominant. The zero vector state refers to a case of a (000) vector or a case of a (111) vector. In the case of the (000) vector, all the switching elements 21*a* to 21*c* are in the off-state. In the case of the (111) vector, all the switching elements 21*a* to 21*c* are in the on-state. Note that (000) and (111) indicate the on/off states of the switching elements 21*a* to 21*c* in the order of the switching elements 21*c*, 21*b*, and 21*a*, where "1" indicates the on-state and "0" indicates the off-state. The detection period Ta for the direct-current bus voltage Vdc corresponds to a period in which the switching element 21a, which is the upper-arm switching element of the inverter 20, is in the on-state in the motor driving apparatus 80, that is, a (111) vector period in which all the switching elements 21a to 21c, which are the upper-arm switching elements of the inverter 20, are in the on-state in the example of FIG. 7. In the case where the detection period Ta is sufficiently longer than time required to detect the direct-current bus voltage Vdc, the motor driving apparatus 80 can detect the direct-current bus voltage Vdc in the (111) vector period even if the voltage modulation factor control unit 75 does not change the detection period Ta, that is, does not perform zero vector correction. The time required to detect the direct-current bus voltage Vdc refers to time between detection of the first voltage which is performed by the voltage detection circuit 50 and calculation of the direct-current bus voltage Vdc which is performed by the control unit 70 on the basis of the first voltage.

Figure 8:
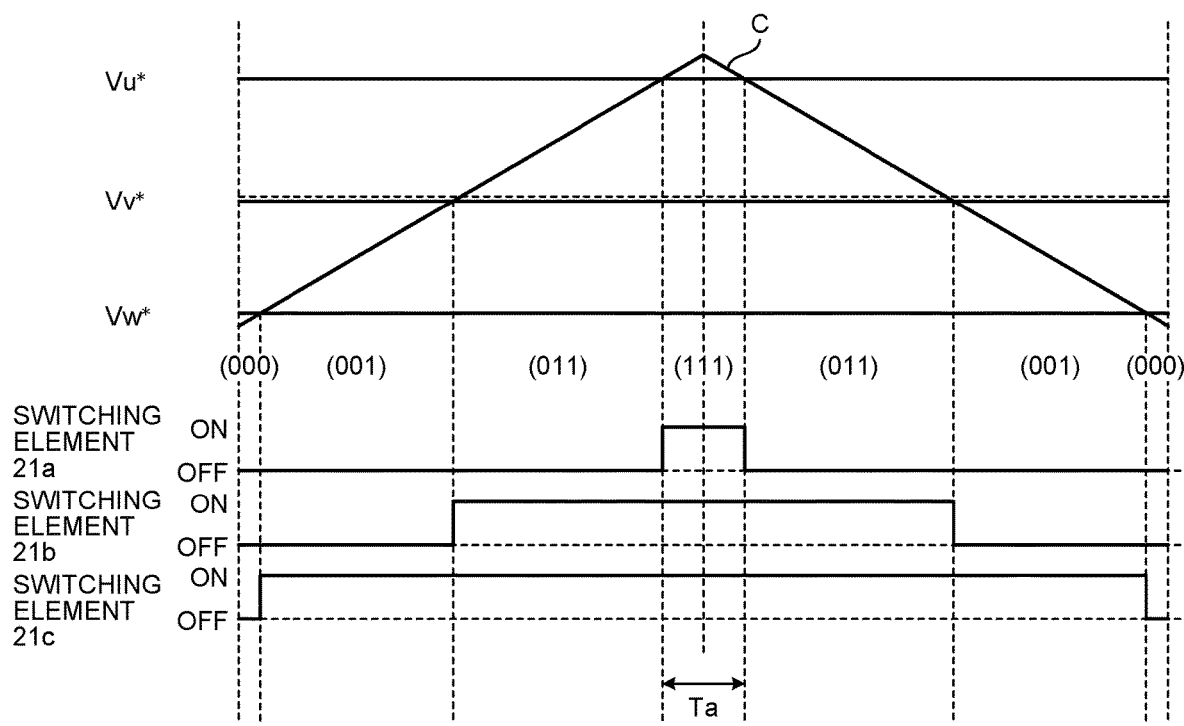
FIG. 8 is a diagram illustrating the detection period in which the direct-current bus voltage can be detected in the case where the voltage command values are large in amplitude in the motor driving apparatus according to the first embodiment.

FIG. 8 is a diagram illustrating the detection period Ta in which the direct-current bus voltage Vdc can be detected in the case where the voltage command values are large in amplitude in the motor driving apparatus 80 according to the first embodiment. When the voltage command values Vu*, Vv*, and Vw* are large in amplitude, that is, when the output voltage modulation factor is large, the respective upper-arm switching elements of the U phase, the V phase, and the W phase, that is, the switching elements 21a to 21c in the inverter 20 are in a state where the zero vector state is short. When the time period of the (111) vector in which all the switching elements 21a to 21c are in the on-state, that is, when the detection period Ta is shorter than the time required to detect the direct-current bus voltage Vdc, there is a possibility that the motor driving apparatus 80 cannot detect the direct-current bus voltage Vdc in the (111) vector period in which all the switching elements 21a to 21c are in the on-state. Furthermore, even if the motor driving apparatus 80 can detect the direct-current bus voltage Vdc in the (111) vector period in which all the switching elements 21a to 21c are in the on-state, a period for detection is limited. This is because the detection period Ta in which the direct-current bus voltage Vdc can be detected is short. Therefore, in the control unit 70, the voltage modulation factor control unit 75 changes the detection period Ta, that is, corrects the range of the zero vector according to the voltage command values.

Figure 9:
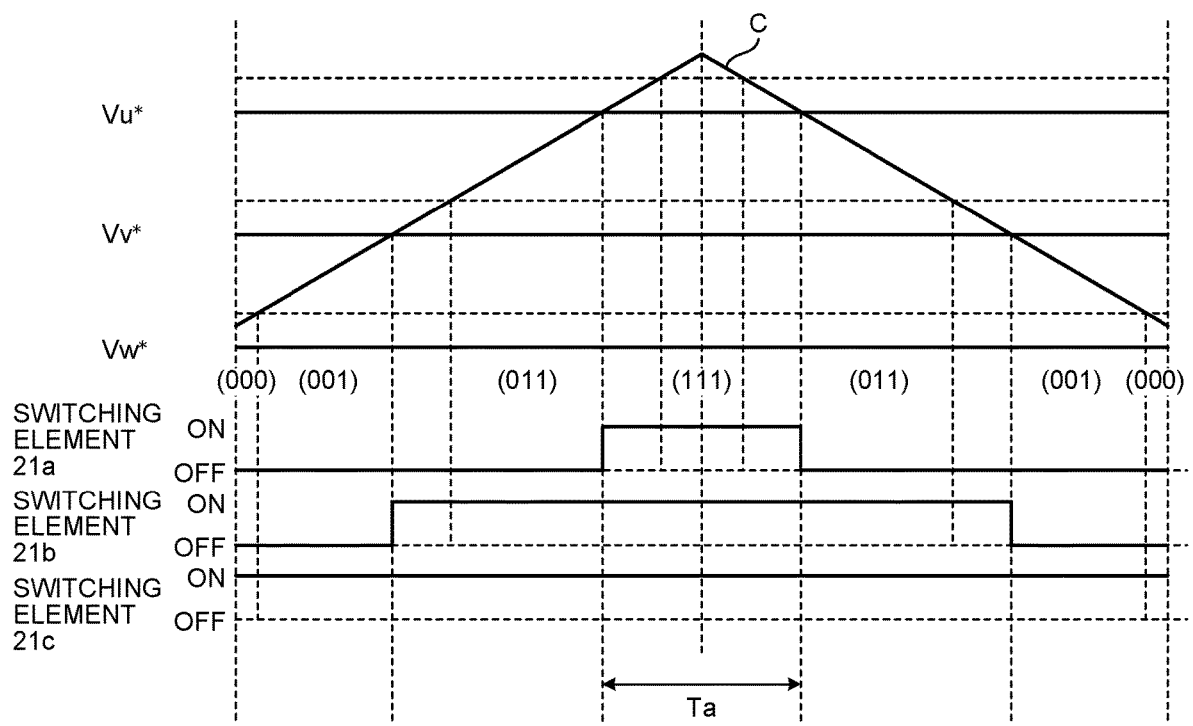
FIG. 9 is a diagram illustrating a state in which the detection period has been extended in the motor driving apparatus according to the first embodiment.
Figure 10:
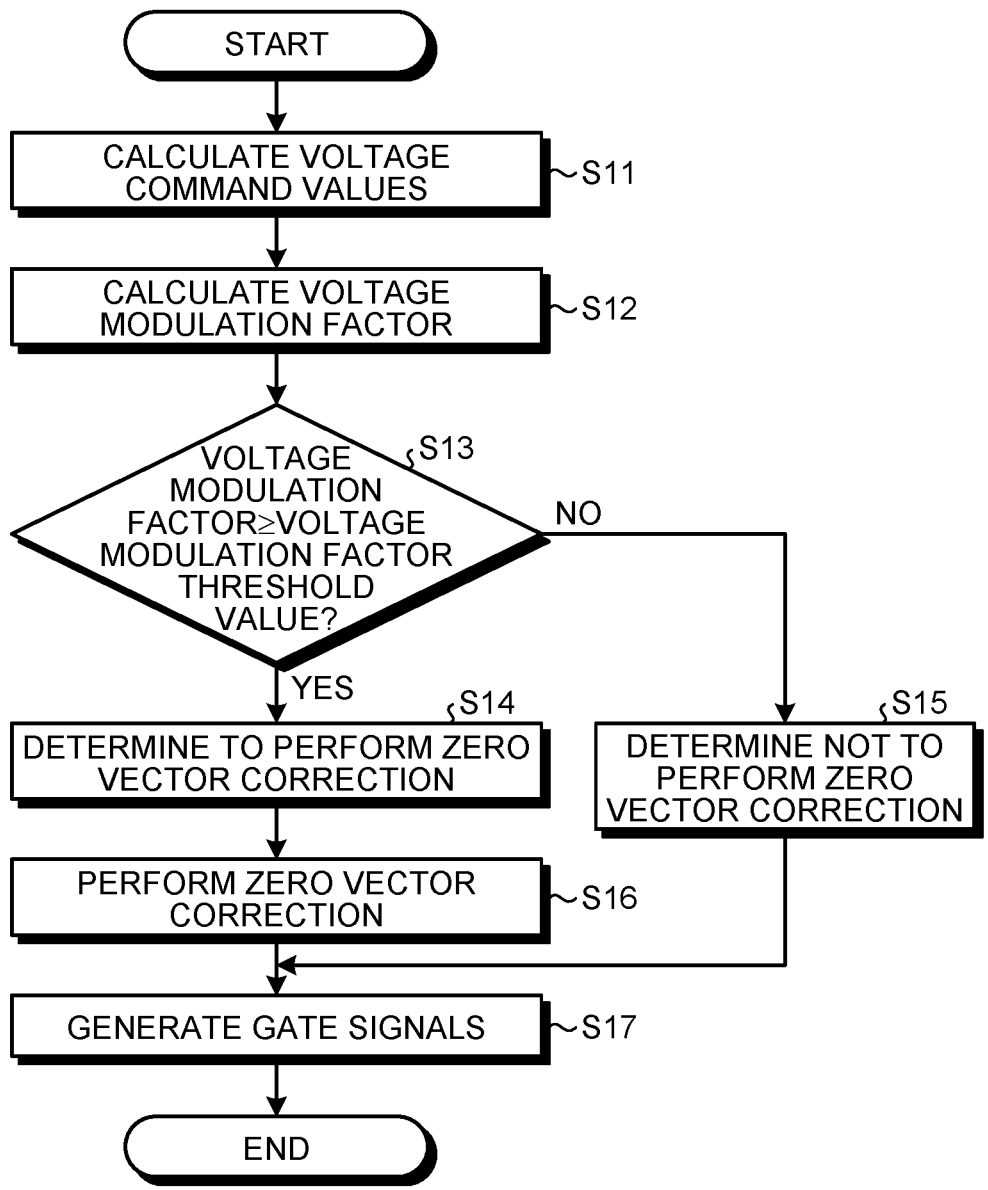
FIG. 10 is a flowchart illustrating operation in which the control unit of the motor driving apparatus according to the first embodiment changes the detection period.

FIG. 9 is a diagram illustrating a state in which the detection period Ta has been extended in the motor driving apparatus 80 according to the first embodiment. FIG. 10 is a flowchart illustrating operation in which the control unit 70 of the motor driving apparatus 80 according to the first embodiment changes the detection period Ta. In the control unit 70, the voltage command value calculation unit 73 calculates the voltage command values Vu*, Vv*, and Vw* (step S11).

When acquiring information on the voltage command values Vu*, Vv*, and Vw* from the voltage command value calculation unit 73, the voltage modulation factor control unit 75 calculates the voltage modulation factor of the inverter 20 on the basis of the voltage command values Vu*, Vv*, and Vw* (step S12). Note that the voltage modulation factor may be calculated by the voltage command value calculation unit 73, and the voltage modulation factor control unit 75 may acquire the calculated voltage modulation factor from the voltage command value calculation unit 73. The voltage modulation factor control unit 75 compares the calculated voltage modulation factor with a voltage modulation factor threshold value for determining whether to perform correction for extending a time period in which the switching elements 21a to 21c are in the on-state (step S13).

Figure 11:
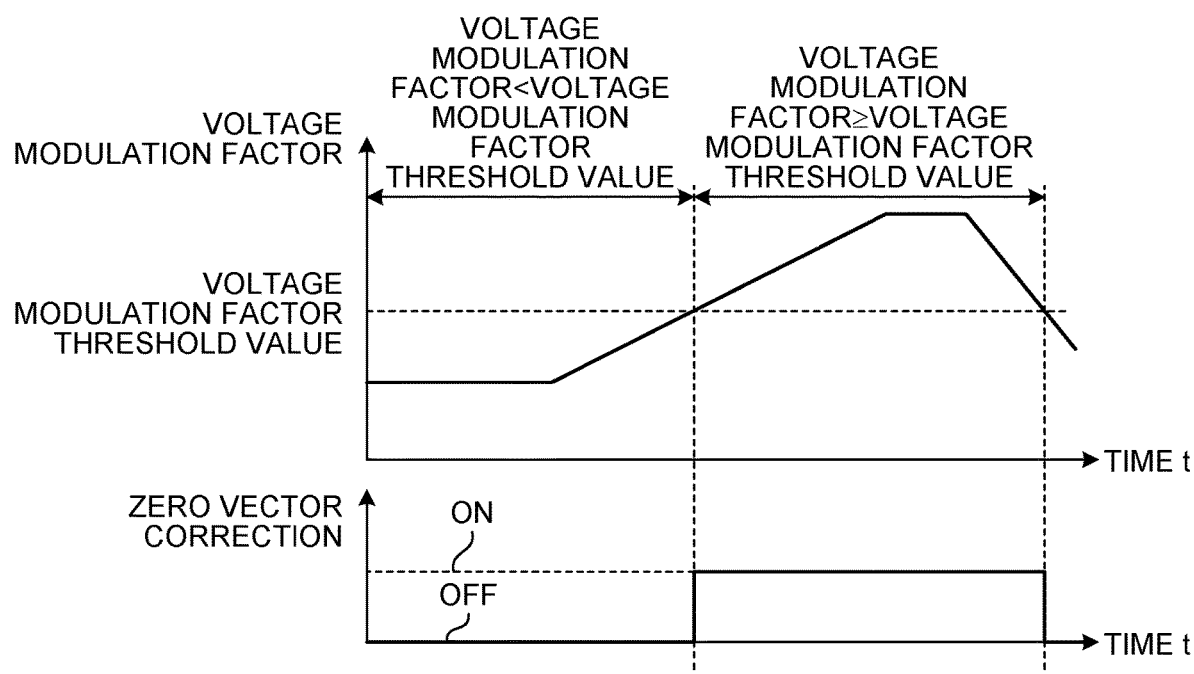
FIG. 11 is a diagram illustrating details of a determination process to be performed in a voltage modulation factor control unit according to the first embodiment.

FIG. 11 is a diagram illustrating details of a determination process to be performed in the voltage modulation factor control unit 75 according to the first embodiment. In FIG. 11, the vertical axis of the upper part of the diagram shows the voltage modulation factor, and the vertical axis of the lower part of the diagram shows the on/off of the zero vector correction. Furthermore, the horizontal axes of the upper part and lower part of the diagram show time in FIG. 11. When the calculated voltage modulation factor is equal to or greater than the voltage modulation factor threshold value (step S13: Yes), the voltage modulation factor control unit 75 determines to perform the zero vector correction for extending the time period in which the switching elements 21a to 21c are in the on-state (step S14). In FIG. 11, this corresponds to a time period in which the zero vector correction is set to on. When the calculated voltage modulation factor is less than the voltage modulation factor threshold value (step S13: No), the voltage modulation factor control unit 75 determines not to perform the zero vector correction for extending the time period in which the switching elements 21a to 21c are in the on-state (step S15). In FIG. 11, this corresponds to a time period in which the zero vector correction is set to off. The voltage modulation factor control unit 75 notifies the voltage command value calculation unit 73 of a determination result. That is, when the voltage modulation factor is less than the voltage modulation factor threshold value, the voltage modulation factor control unit 75 does not change the length of the detection period Ta, and when the voltage modulation factor is equal to or greater than the voltage modulation factor threshold value, the voltage modulation factor control unit 75 instructs the voltage command value calculation unit 73 to increase the length of the detection period Ta such that the detection period Ta becomes longer than a period that would originally be obtained on the basis of the voltage modulation factor in the voltage command value calculation unit 73.

When the voltage command value calculation unit 73 receives a notification to the effect that the zero vector correction should be performed, the voltage command value calculation unit 73 performs the zero vector correction (step S16). For example, the voltage command value calculation unit 73 performs correction such that the voltage command values Vu*, Vv*, and Vw* calculated by use of the γ-axis voltage command Vγ*, the δ-axis voltage command Vδ*, and the direct-current bus voltage Vdc become smaller as a whole. In FIG. 9, the voltage command values Vu*, Vv*, and Vw* have been corrected downward as a whole as compared with FIG. 8. The voltage command value calculation unit 73 outputs the corrected voltage command values Vu*, Vv*, and Vw* to the gate signal generation unit 74. Note that when the voltage command value calculation unit 73 receives a notification to the effect that the zero vector correction need not be performed, the voltage command value calculation unit 73 outputs the voltage command values Vu*, Vv*, and Vw* calculated in step S11 to the gate signal generation unit 74 as they are.

The gate signal generation unit 74 compares the voltage command values Vu*, Vv*, and Vw* acquired from the voltage command value calculation unit 73 with the carrier signal C, and generates the gate signals 71 (step S17). The gate signal generation unit 74 generates the gate signals 71 that extend the time period in which the switching elements 21a to 21c are in the on-state as compared with that in FIG. 8. Note that when the voltage modulation factor becomes smaller after the detection period Ta is extended as a result of repeatedly performing the process of the flowchart illustrated in FIG. 10, the control unit 70 can return the length of the detection period Ta to the period that would originally be obtained on the basis of the voltage modulation factor in the voltage command value calculation unit 73.

In one cycle of the carrier signal C, the voltage modulation factor control unit 75 allocates the (000) vector time period in which all the switching elements 21a to 21c, which are the upper-arm switching elements of the inverter 20, are in the off-state, to the (111) vector time period in which all the switching elements 21a to 21c, which are the upper-arm switching elements of the inverter 20, are in the on-state. That is, when the voltage modulation factor is equal to or greater than the voltage modulation factor threshold value, the voltage modulation factor control unit 75 instructs the voltage command value calculation unit 73 to increase the lengths of a second period and a third period such that the second period and the third period become longer than the period that would originally be obtained on the basis of the voltage modulation factor, as with the detection period Ta that is the first period. The second period is a period in which the switching element 21b, which is the upper-arm switching element of the switching element pair connected to the second connection line 42, is in the on-state. The third period is a period in which the switching element 21c, which is the upper-arm switching element of the switching element pair connected to the third connection line 43, is in the on-state. In the following description, the switching element pair to which the first connection line 41 is connected may be referred to as a first switching element pair, the switching element pair to which the second connection line 42 is connected may be referred to as a second switching element pair, and the switching element pair to which the third connection line 43 is connected may be referred to as a third switching element pair. As a result, the motor driving apparatus 80 can extend the detection period Ta for the direct-current bus voltage Vdc by extending the (111) vector time period in which the switching elements 21a to 21c, which are the upper-arm switching elements, are in the on-state. The control unit 70 changes the detection period Ta according to the voltage command values Vu*, Vv*, and Vw*, that is, the direct-current bus voltage Vdc to be used for calculating the voltage command values Vu*, Vv*, and Vw*.

The motor driving apparatus 80 does not change the zero vector time of the inverter 20 per cycle of the carrier signal C, that is, the total time of the (000) vector and the (111) vector. As a result, the motor driving apparatus 80 can extend the time period in which the switching elements 21a to 21c, which are the upper-arm switching elements of the inverter 20, are in the on-state, that is, the detection period Ta while keeping the line voltage value of the three-phase alternating-current voltage output by the inverter 20 at the same level. Furthermore, the motor driving apparatus 80 may control operation of the motor 30 by using a two-phase modulation method that is a motor control method based on allocation of the (000) vector time period in which all the switching elements 21a to 21c, which are the upper-arm switching elements of the inverter 20, are in the off-state to the (111) vector time period in which all the switching elements 21a to 21c, which are the upper-arm switching elements of the inverter 20, are in the on-state. In this case, the motor driving apparatus 80 can maximize the time period in which the switching elements 21a to 21c, which are the upper-arm switching elements of the inverter 20, are in the on-state by performing control based on the two-phase modulation method, so that the direct-current bus voltage Vdc can be detected for a longer time period.

Note that while the case where the voltage modulation factor control unit 75 compares the voltage modulation factor and the voltage modulation factor threshold value has been described, this is just an example, and a plurality of voltage modulation factor threshold values may be used. The motor driving apparatus 80 can change the correction amount in performing downward correction of the voltage command values Vu*, Vv*, and Vw* illustrated in FIG. 9 by using a plurality of voltage modulation factor threshold values.

The case where the voltage command value calculation unit 73 corrects the calculated voltage command values Vu*, Vv*, and Vw* so that the values become smaller as a whole has been described as a specific example of the zero vector correction. Meanwhile, the zero vector correction is not limited thereto. Other methods may be used as long as an effect such as that illustrated in FIG. 9 can be obtained as a result of comparing the voltage command values Vu*, Vv*, and Vw* with the carrier signal C in the gate signal generation unit 74.

Next, a hardware configuration of the motor driving apparatus 80 will be described. The control unit 70, which is a microcontroller as described above, is also implemented by processing circuitry in the motor driving apparatus 80. That is, the motor driving apparatus 80 includes processing circuitry for calculating the direct-current bus voltage Vdc. The processing circuitry may be a memory and a processor that executes programs stored in the memory, or may be dedicated hardware.

Figure 12:
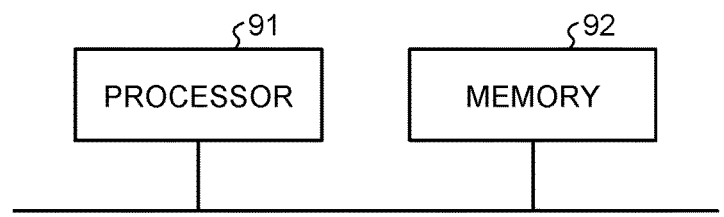
FIG. 12 is a diagram illustrating an example in which processing circuitry included in the motor driving apparatus according to the first embodiment includes a processor and a memory.

FIG. 12 is a diagram illustrating an example in which the processing circuitry included in the motor driving apparatus 80 according to the first embodiment includes a processor and a memory. In the case where the processing circuitry includes a processor 91 and a memory 92, each function of the processing circuitry is implemented by software, firmware, or a combination of software and firmware. The software or firmware is described as a program, and stored in the memory 92. The processor 91 reads and executes the program stored in the memory 92 to implement each function of the processing circuitry. That is, the processing circuitry includes the memory 92 for storing programs that cause calculation of the direct-current bus voltage Vdc to be performed as a result. In addition, it can also be said that these programs cause a computer to execute the procedure and method for the control unit 70.

Here, the processor 91 may be a central processing unit (CPU), a processing device, an arithmetic device, a microprocessor, a microcomputer, a digital signal processor (DSP), or the like. Furthermore, for example, a nonvolatile or volatile semiconductor memory such as a random access memory (RAM), a read only memory (ROM), a flash memory, an erasable programmable ROM (EPROM), or an electrically EPROM (EEPROM) (registered trademark), a magnetic disk, a flexible disk, an optical disk, a compact disk, a mini disk, or a digital versatile disc (DVD) is applicable to the memory 92.

Figure 13:
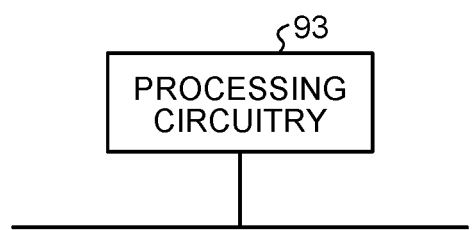
FIG. 13 is a diagram illustrating an example in which the processing circuitry included in the motor driving apparatus according to the first embodiment includes dedicated hardware.

FIG. 13 is a diagram illustrating an example in which the processing circuitry included in the motor driving apparatus 80 according to the first embodiment includes dedicated hardware. In the case where the processing circuitry includes dedicated hardware, for example, a single circuit, a composite circuit, a programmed processor, a parallel-programmed processor, an application specific integrated circuit (ASIC), a field programmable gate array (FPGA), or a combination thereof is applicable to processing circuitry 93 illustrated in FIG. 13. The functions of the control unit 70 may be separately implemented by the processing circuitry 93, or may be collectively implemented by the processing circuitry 93.

Note that some of the functions of the control unit 70 may be implemented by dedicated hardware, and some of the other functions thereof may be implemented by software or firmware. Thus, the processing circuitry can implement each of the above-described functions by means of dedicated hardware, software, firmware, or a combination thereof. Control units of motor driving apparatuses to be described in the following embodiments have a similar hardware configuration.

As described above, according to the present embodiment, the voltage detection circuit 50 that detects a phase voltage so as to detect the direct-current bus voltage Vdc is disposed on the output side of the inverter 20 in the motor driving apparatus 80. The voltage detection circuit 50 detects a voltage output as a result of operation of the inverter 20. The control unit 70 calculates the direct-current bus voltage Vdc by using the voltage detection result 51 for the detection period Ta provided from the voltage detection circuit 50. No current flows into the voltage detection circuit 50 when the inverter 20 is not operating. The control unit 70 calculates the direct-current bus voltage Vdc during a period in which the inverter 20 is operating. As a result, the motor driving apparatus 80 can reduce the standby power of the voltage detection circuit 50 to be provided when the inverter 20 is stopped. Furthermore, the motor driving apparatus 80 can prevent or reduce a current flow to the voltage detection circuit 50 without using a switching element or the like. Thus, it is possible to reduce the standby power with a simple configuration without increasing the size of the apparatus.

Furthermore, the motor driving apparatus 80 changes the detection period Ta according to the voltage command values Vu*, Vv*, and Vw*, that is, the voltage modulation factor of the inverter 20. When the voltage modulation factor is large and the detection period Ta is short, the motor driving apparatus 80 can extend the detection period Ta without changing control over the motor 30, and improve the accuracy of detecting the direct-current bus voltage Vdc.

Note that in the first embodiment, the voltage detection circuit 50 is connected to the first connection line 41 of the connection line group 40 to detect the phase voltage Vu of the U phase, and the control unit 70 calculates the direct-current bus voltage Vdc on the basis of the phase voltage Vu of the U phase, while this is just an example and the present invention is not limited thereto. The voltage detection circuit 50 may be connected to the second connection line 42 to detect a phase voltage Vv of the V phase, or may be connected to the third connection line 43 to detect a phase voltage Vw of the W phase. Even in the case where the phase voltage Vv of the V phase or the phase voltage Vw of the W phase is used, the control unit 70 can calculate the direct-current bus voltage Vdc by using a similar calculation method to that in the case where the phase voltage Vu of the U phase is used.

Semiconductor switching elements such as insulated gate bipolar transistors (IGBTs) and metal oxide semiconductor field effect transistors (MOSFETs) are used for the switching elements 21a to 21f to be used in the inverter 20. With regard to the material to be used to form a semiconductor switching element, generally, a semiconductor made of silicon (Si) is the current mainstream. However, a wide bandgap semiconductor made of silicon carbide (SiC), gallium nitride (GaN), gallium oxide ($Ga_2O_3$), diamond, or the like may be used in place of silicon (Si).

Low resistance at the time of conduction is a characteristic of the switching elements 21a to 21f formed of such a wide bandgap semiconductor. Because of this characteristic, the switching elements 21a to 21f can reduce loss. Furthermore, the switching elements 21a to 21f formed of such a wide bandgap semiconductor have high withstand voltage characteristics and high allowable current density. Therefore, the switching elements 21a to 21f can be reduced in size, and use of the miniaturized switching elements 21a to 21f enables miniaturization of a semiconductor module in which the miniaturized switching elements 21a to 21f are incorporated. Furthermore, the switching elements 21a to 21f formed of such a wide bandgap semiconductor have high heat resistance. Therefore, since heat dissipation parts can be reduced in size, the semiconductor module can be further reduced in size. Moreover, the switching elements 21a to 21f formed of such a wide bandgap semiconductor have low power loss. Therefore, the efficiency of the switching elements and the like can be increased. Thus, it is possible to increase the efficiency of the semiconductor module. Furthermore, since switching can be performed at a high frequency, a high-frequency current can be passed through the motor 30. Note that it is desirable that all the switching elements 21a to 21f be formed of a wide bandgap semiconductor, while it is also possible to achieve the effects described in this embodiment by adopting a configuration in which some of the switching elements are formed of a wide bandgap semiconductor.

Second Embodiment

In a second embodiment, the voltage detection circuit 50 includes a filter for preventing or reducing ringing. A difference from the first embodiment will be described.

Figure 14:
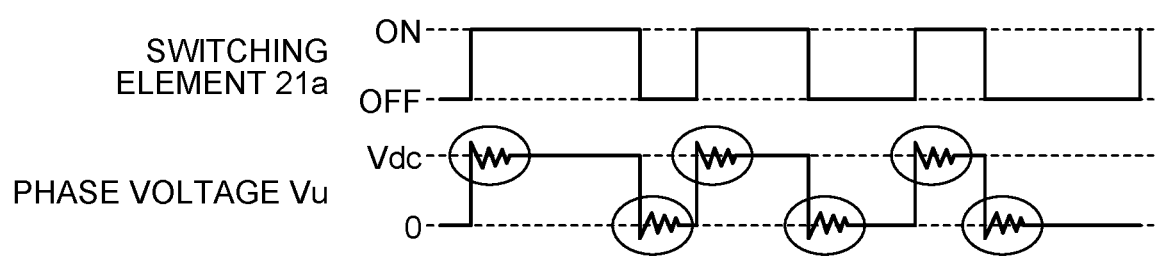
FIG. 14 is a diagram illustrating examples of the on/off timing of the switching element and a phase voltage to be output, in the inverter of the motor driving apparatus of the first embodiment in which the voltage detection circuit includes no filter.

The configuration of the motor driving apparatus 80 of the second embodiment is similar to the configuration of the motor driving apparatus 80 of the first embodiment illustrated in FIG. 1. FIG. 14 is a diagram illustrating examples of the on/off timing of the switching element 21a and the phase voltage Vu to be output, in the inverter 20 of the motor driving apparatus 80 of the first embodiment in which the voltage detection circuit 50 includes no filter. Ideally, the phase voltage Vu should change to 0 [v] or Vdc [v] due to the on/off of the switching element 21a. However, in reality, ringing may occur when the phase voltage Vu changes from 0 [v] to Vdc [v] or changes from Vdc [v] to 0 [v]. Ringing may be caused by a wire inductance component, an impedance component, or the like of a board with a circuit mounted thereon, or may be caused by the influence of noise around the circuit on the board. Therefore, it is difficult to pinpoint the cause, and it is very difficult to prevent or reduce ringing.

For example, in the case where the ideal output voltage of the phase voltage Vu is 0 [v] and Vdc [v], ringing may cause an excessive voltage having a value of Vdc [v] or more to be output instantaneously. Therefore, if a voltage including ringing is directly input to the control unit 70, which is a microcontroller, a voltage equal to or greater than a voltage allowed by the control unit 70 may be applied, and this may cause a failure of the control unit 70. In the motor driving apparatus 80, ringing can be prevented or reduced by addition of a filter to a stage before the control unit 70, that is, the voltage detection circuit 50, so that it is possible to prevent an excessive voltage from being input to the control unit 70.

Figure 15:
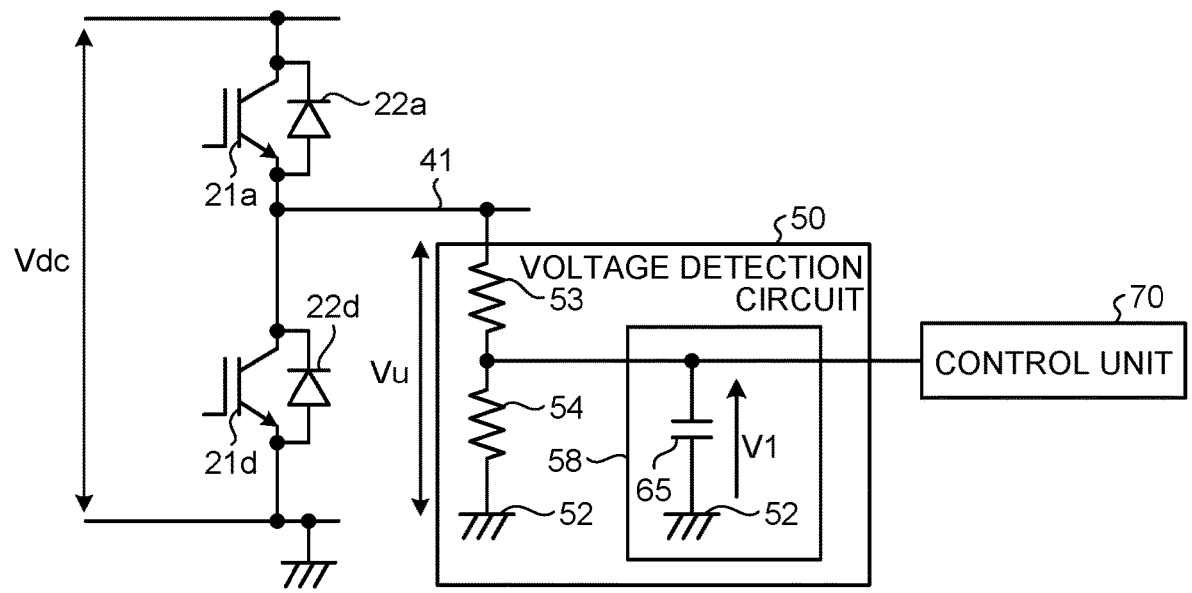
FIG. 15 is a diagram illustrating an example configuration of a voltage detection circuit of a motor driving apparatus according to a second embodiment.
Figure 16:
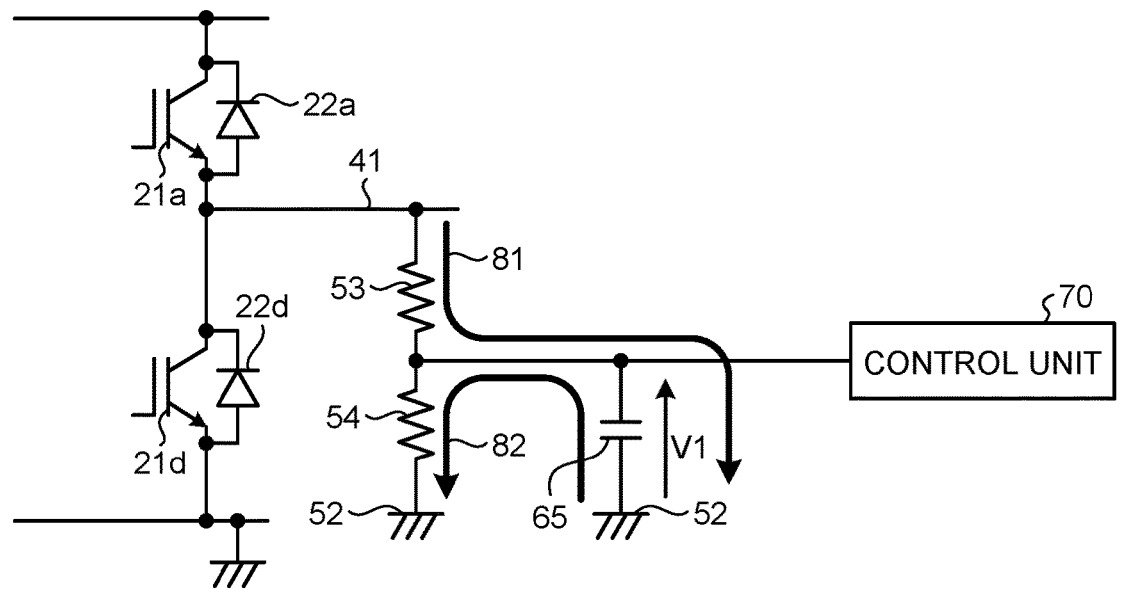
FIG. 16 is a diagram illustrating examples of current paths of the voltage detection circuit of the motor driving apparatus according to the second embodiment.

FIG. 15 is a diagram illustrating an example configuration of the voltage detection circuit 50 of the motor driving apparatus 80 according to the second embodiment. The voltage detection circuit 50 of the second embodiment is obtained by addition of a filter 58 to the voltage detection circuit 50 illustrated in FIG. 2. One end of the filter 58 is connected to a first wire at a second connecting point. The first wire connects a first connecting point and the control unit 70, the first connecting point being a connecting point of the resistor 53 and the resistor 54. The opposite end of the filter 58 is connected to the ground 52. The filter 58 includes a filter capacitor 65 that forms a filter circuit together with the resistor 53 or the resistor 54. Let Cfil be the capacitance of the filter capacitor 65. FIG. 16 is a diagram illustrating examples of current paths of the voltage detection circuit 50 of the motor driving apparatus 80 according to the second embodiment. When the switching element 21a is in the on-state, a current flows from the inverter 20 through the voltage detection circuit 50 as indicated by a current path 81. In this case, the voltage detection circuit 50 outputs, to the control unit 70, a voltage with a steady-state value of the first voltage V1 at a response speed of a time constant τ expressed as follows:

$$\tau = R1 \times Cfil,$$

where τ denotes the time constant of a filter circuit including the resistor 53 having a resistance of the resistance value R1 and the filter capacitor 65. Furthermore, when the switching element 21a is in the off-state, a current flows from the filter capacitor 65 through the voltage detection circuit 50 as indicated by a current path 82. In this case, the voltage detection circuit 50 outputs, to the control unit 70, a voltage with a steady-state value of 0 at a response speed of the time constant τ expressed as follows:

$$\tau = R2 \times Cfil,$$

where τ denotes the time constant of a filter circuit including the resistor 54 having a resistance of the resistance value R2 and the filter capacitor 65.

Note that the resistance value R1 of the resistor 53, the resistance value R2 of the resistor 54, and the capacitance Cfil of the filter capacitor 65 included in the filter 58 are set such that the time constant τ calculated on the basis of the resistance value R1 of the resistor 53 or the resistance value R2 of the resistor 54, and the capacitance Cfil of the filter capacitor 65 is smaller than the detection period Ta. Specifically, the resistance values R1 and R2 and the capacitance Cfil are set such that the time constant τ of the filter circuit is sufficiently small relative to the minimum on-time width of the phase voltage input from the inverter 20 to the voltage detection circuit 50, that is, the minimum on-time width of the switching element 21a. For example, the resistance values R1 and R2 and the capacitance Cfil are set such that the time constant τ is less than ⅕ of the minimum on-time width described above. Thus, it is possible to ensure sufficient time before the first voltage V1 output from the voltage detection circuit 50 to the control unit 70 becomes a steady-state value. As a result, the motor driving apparatus 80 can prevent or reduce ringing of the first voltage V1 input to the control unit 70 and accurately detect the direct-current bus voltage Vdc.

Figure 17:
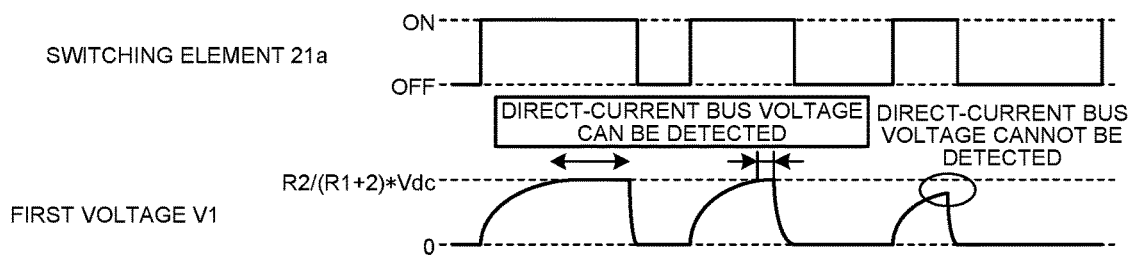
FIG. 17 is a diagram illustrating examples of the on/off timing of the switching element in the inverter and the first voltage to be output from the voltage detection circuit in the case where the voltage detection circuit includes a filter in the motor driving apparatus according to the first embodiment.

FIG. 17 is a diagram illustrating examples of the on/off timing of the switching element 21a in the inverter 20 and the first voltage V1 to be output from the voltage detection circuit 50 in the case where the voltage detection circuit 50 includes a filter in the motor driving apparatus 80 according to the first embodiment. The control unit 70 can calculate the direct-current bus voltage Vdc when the first voltage V1 illustrated in the lower part of FIG. 17 reaches "(R2/(R1+R2))×Vdc". Meanwhile, since the first voltage V1 rises at the response speed of the time constant τ of the filter circuit, it takes time for the first voltage V1 to reach "(R2/(R1+R2))×Vdc". When an induced voltage of the motor 30 is high, or when the motor 30 is driven by a high load in the motor driving apparatus 80, the inverter 20 needs to operate in a region where a voltage modulation factor is high. Therefore, the time period in which the switching element 21a is in the on-state is shortened, so that the time period in which the direct-current bus voltage Vdc can be detected is shortened. For example, if the voltage modulation factor increases and the time period in which the switching element 21a is in the on-state is reduced to about five times or less of the time constant τ of the filter circuit, there is a possibility that the first voltage V1 does not fully rise to "(R2/(R1+R2))×Vdc", as illustrated in the rightmost part on the lower side in FIG. 17, so that the control unit 70 may erroneously detect a voltage value lower than an actual voltage value as the first voltage V1.

Figure 18:
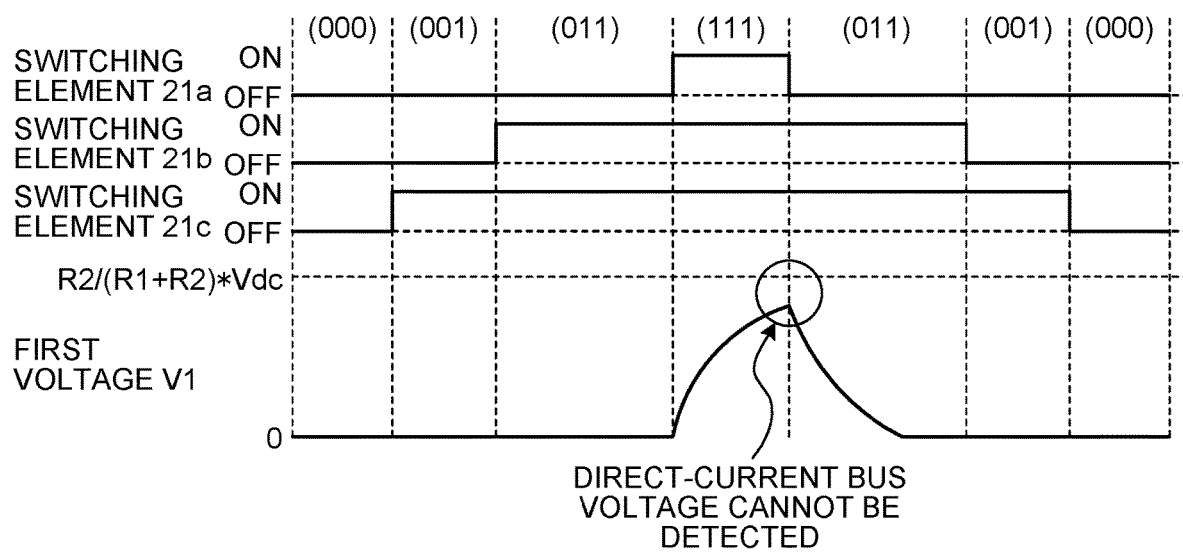
FIG. 18 is a diagram illustrating a state before control is performed in such a way as to extend a time period in which switching elements are in an on-state in the motor driving apparatus according to the second embodiment.
Figure 19:
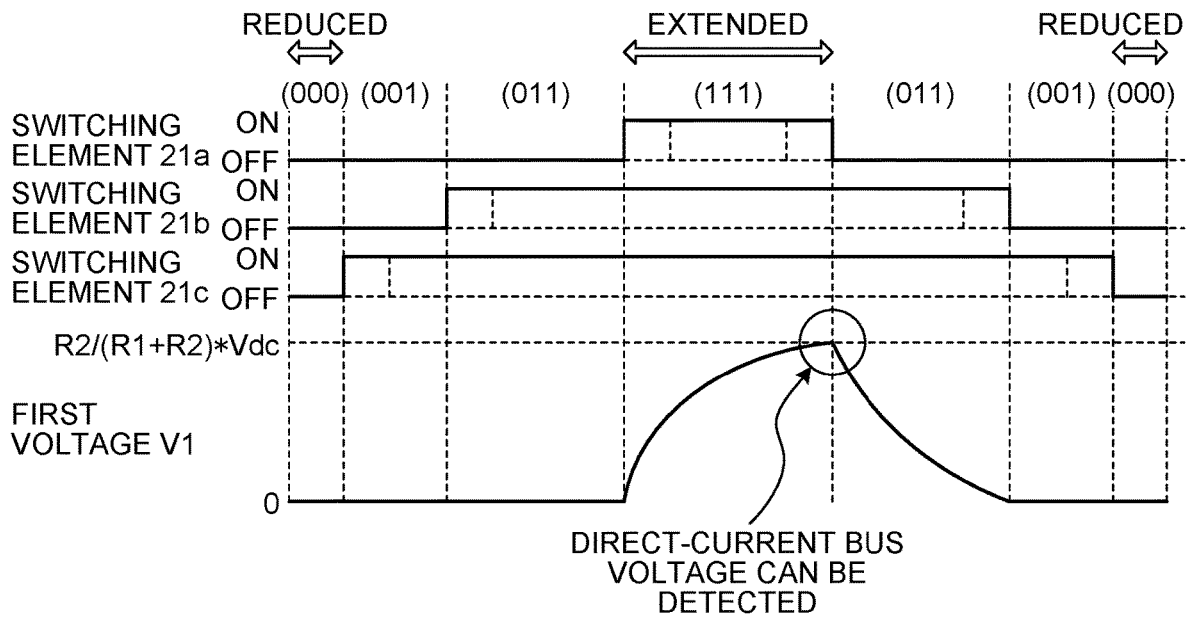
FIG. 19 is a diagram illustrating a state after control has been performed in such a way as to extend the time period in which the switching elements are in the on-state in the motor driving apparatus according to the second embodiment.

In this case, the control unit 70 performs control in such a way as to extend the time period in which the switching elements 21a to 21c are in the on-state, that is, extend the detection period Ta, as in the first embodiment. FIG. 18 is a diagram illustrating a state before control is performed in such a way as to extend the time period in which the switching elements 21a to 21c are in the on-state in the motor driving apparatus 80 according to the second embodiment. FIG. 19 is a diagram illustrating a state after control has been performed in such a way as to extend the time period in which the switching elements 21a to 21c are in the on-state in the motor driving apparatus 80 according to the second embodiment. The control for extending the time period in which the switching elements 21a to 21c are in the on-state in the motor driving apparatus 80, specifically, details of control to be performed by the control unit 70 are similar to those in the first embodiment. The motor driving apparatus 80 extends the (111) vector period in which all the switching elements 21a to 21c, which are the upper-arm switching elements of the inverter 20, are in the on-state by reducing the (000) vector period in which all the switching elements 21a to 21c, which are the upper-arm switching elements of the inverter 20, are in the off-state, and allocating the reduced portion of the (000) vector period to the (111) vector period in one cycle of the carrier signal C. As a result, the motor driving apparatus 80 can extend the detection period Ta for the direct-current bus voltage Vdc as illustrated in FIG. 19.

As described above, according to the present embodiment, the motor driving apparatus 80 includes the filter 58 provided in the voltage detection circuit 50. As a result, even when ringing occurs in the phase voltage output from the inverter 20, the motor driving apparatus 80 can prevent or reduce ringing, and can avoid a situation in which an excessive voltage is input to the control unit 70. Furthermore, even if it takes time for the first voltage V1 to reach "(R2/(R1+R2))×Vdc" due to the influence of the filter 58, the motor driving apparatus 80 can extend the detection period Ta for the direct-current bus voltage Vdc by performing control in such a way as to extend the time period in which the switching elements 21a to 21c are in the on-state.

Third Embodiment

In a third embodiment, the voltage detection circuit 50 includes a resistor in the filter 58, in addition to the resistors 53 and 54 used in the voltage-dividing resistor. A difference from the second embodiment will be described.

Figure 20:
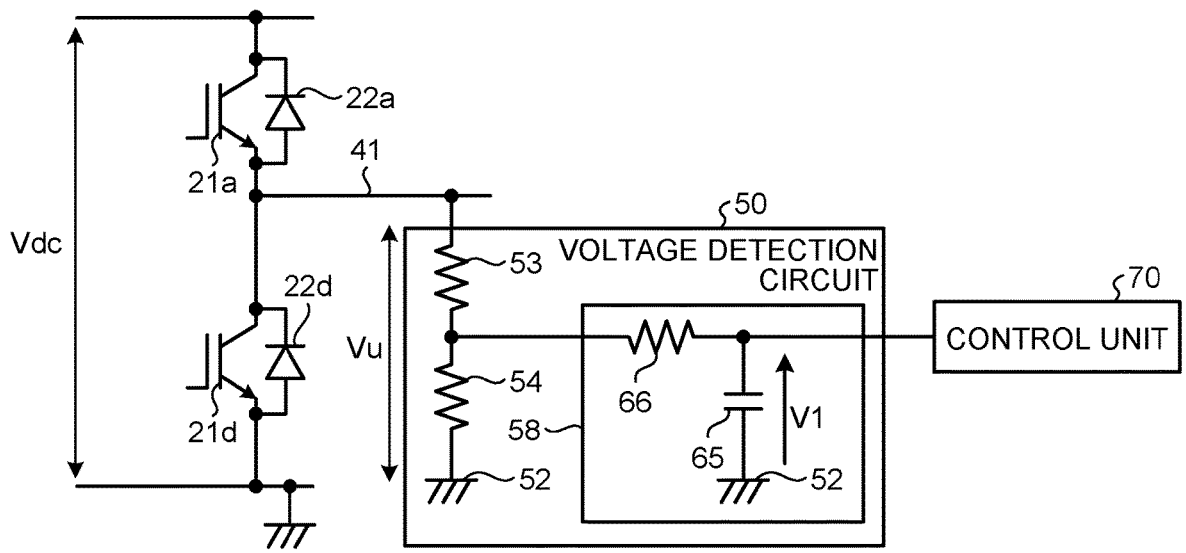
FIG. 20 is a diagram illustrating an example configuration of a voltage detection circuit of a motor driving apparatus according to a third embodiment.

The configuration of the motor driving apparatus 80 of the third embodiment is similar to the configuration of the motor driving apparatus 80 of the first embodiment illustrated in FIG. 1. FIG. 20 is a diagram illustrating an example configuration of the voltage detection circuit 50 of the motor driving apparatus 80 according to the third embodiment. The voltage detection circuit 50 of the third embodiment is obtained by addition of a resistor 66 having a resistance of a resistance value Rfil to the inside of the filter 58 of the voltage detection circuit 50 illustrated in FIG. 15. The resistor 66 is a third resistor with one end connected to the first connecting point and the opposite end connected to the second connecting point on the first wire. In the voltage detection circuit 50 of the third embodiment, an RC filter can be constructed with only the filter 58. It is possible to reduce limitations on placement of the RC filter by inserting the resistor 66 other than the voltage-dividing resistor of the voltage detection circuit 50, instead of adopting a configuration in which the resistor 53 or the resistor 54 of the voltage detection circuit 50 and the filter capacitor 65 form the filter circuit as in the second embodiment. For example, among elements included in the voltage detection circuit 50, the filter 58 is disposed around the control unit 70. As a result, it is possible to prevent or reduce the influence of ringing caused by conductive noise, wire impedance, or the like generated at the board on which the circuit of the motor driving apparatus 80 has been mounted. The motor driving apparatus 80 can prevent or reduce input of excessive voltage, noise, and the like to the control unit 70, and can stably detect the direct-current bus voltage.

Note that, in the voltage detection circuit 50, it is also possible to form the filter circuit by using the resistor 53, the resistor 66, and the filter capacitor 65, or by using the resistor 54, the resistor 66, and the filter capacitor 65.

As described above, according to the present embodiment, the motor driving apparatus 80 includes the resistor 66 provided in the filter 58 of the voltage detection circuit 50, the resistor 66 being different from the resistors 53 and 54 used in the voltage-dividing resistor. As a result, the motor driving apparatus 80 can reduce limitations on arrangement of each component as compared with the case of the second embodiment.

Fourth Embodiment

The control for extending the detection period Ta has been described in the second embodiment. However, there is a limitation on a period to which the detection period Ta can be extended. In such a case, it is conceivable that depending on the time constant of the filter circuit, the first voltage V1 does not rise fully during the detection period Ta. In a fourth embodiment, the actual first voltage V1 is estimated in the course of the rising of the first voltage V1.

Figure 21:
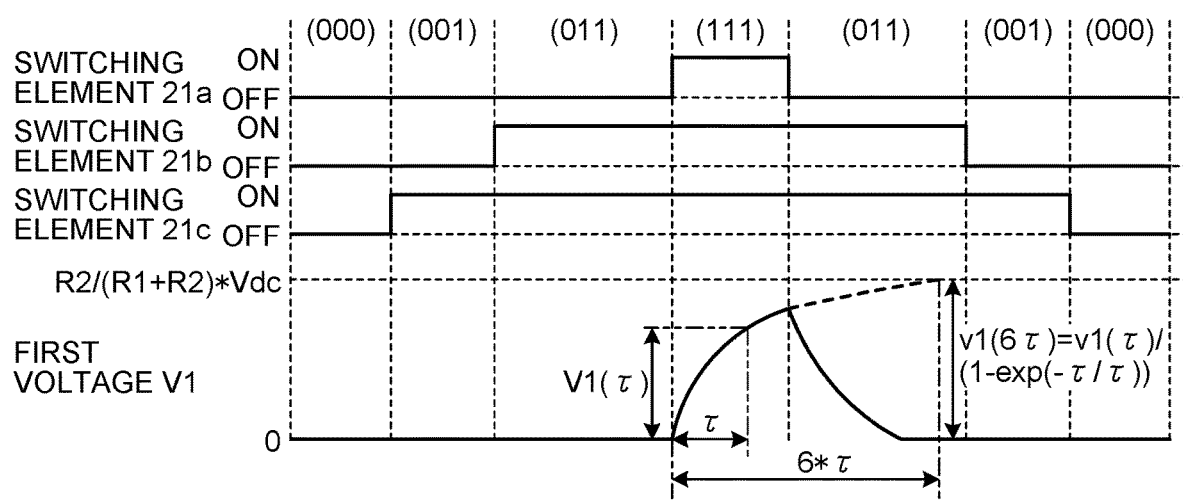
FIG. 21 is a diagram illustrating operation in which a first voltage is estimated in a motor driving apparatus according to a fourth embodiment.

The configuration of the motor driving apparatus 80 of the fourth embodiment is similar to the configuration of the motor driving apparatus 80 of the first embodiment illustrated in FIG. 1. FIG. 21 is a diagram illustrating operation in which the first voltage V1 is estimated in the motor driving apparatus 80 according to the fourth embodiment. FIG. 21 illustrates a state in which the first voltage V1 has not fully risen during the time period in which the switching elements 21a to 21c are in the on-state, that is, the detection period Ta. Furthermore, it is assumed that the first voltage V1 does not fully rise even if the time period in which the switching elements 21a to 21c are in the on-state is extended. In such a case, the control unit 70 may erroneously detect the direct-current bus voltage Vdc.

Therefore, in the control unit 70, the voltage command value calculation unit 73 detects a voltage $V1(\tau)$, which is the first voltage V1 input to the control unit 70 at the response speed of the time constant $\tau$ of the filter circuit, and estimates the actual first voltage V1 by using the formula "$V1(6\tau)=V1(\tau)/(1-\exp(-\tau/\tau))$". This formula takes into account the slope of the first voltage V1. The voltage command value calculation unit 73 detects the voltage value $V1(\tau)$ after the elapse of the time constant $\tau$ of the filter circuit without ensuring the rise time of the first voltage V1. It is thus possible to calculate the steady-state voltage value that is the first voltage V1 having risen to 99.7% of a full voltage. In this way, the voltage command value calculation unit 73 uses the time constant $\tau$ and estimates the first voltage V1 detected by the voltage detection circuit 50 on the basis of a voltage value detected after the elapse of a fourth period from the input of the first voltage V1. The fourth period refers to a time period represented by the time constant $\tau$ of the filter circuit.

As described above, according to the present embodiment, when the voltage modulation factor is high and the time constant $\tau$ of the filter circuit cannot be set to be sufficiently small relative to the time period in which the switching elements 21a to 21c are in the on-state, that is, the detection period Ta, the voltage command value calculation unit 73 in the control unit 70 estimates the first voltage V1 by using the voltage value $V1(\tau)$ detected after the elapse of the time represented by the time constant $\tau$ of the filter circuit. As a result, the voltage command value calculation unit 73 can acquire the first voltage V1 even when the rise time of the first voltage V1 cannot be ensured.

Fifth Embodiment

In each of the first to fourth embodiments, the motor driving apparatus 80 includes a single inverter 20 and a single motor 30. In a fifth embodiment, the motor driving apparatus includes a plurality of inverters connected in parallel, and each inverter drives a motor connected thereto. A difference from the first embodiment will be described.

Figure 22:
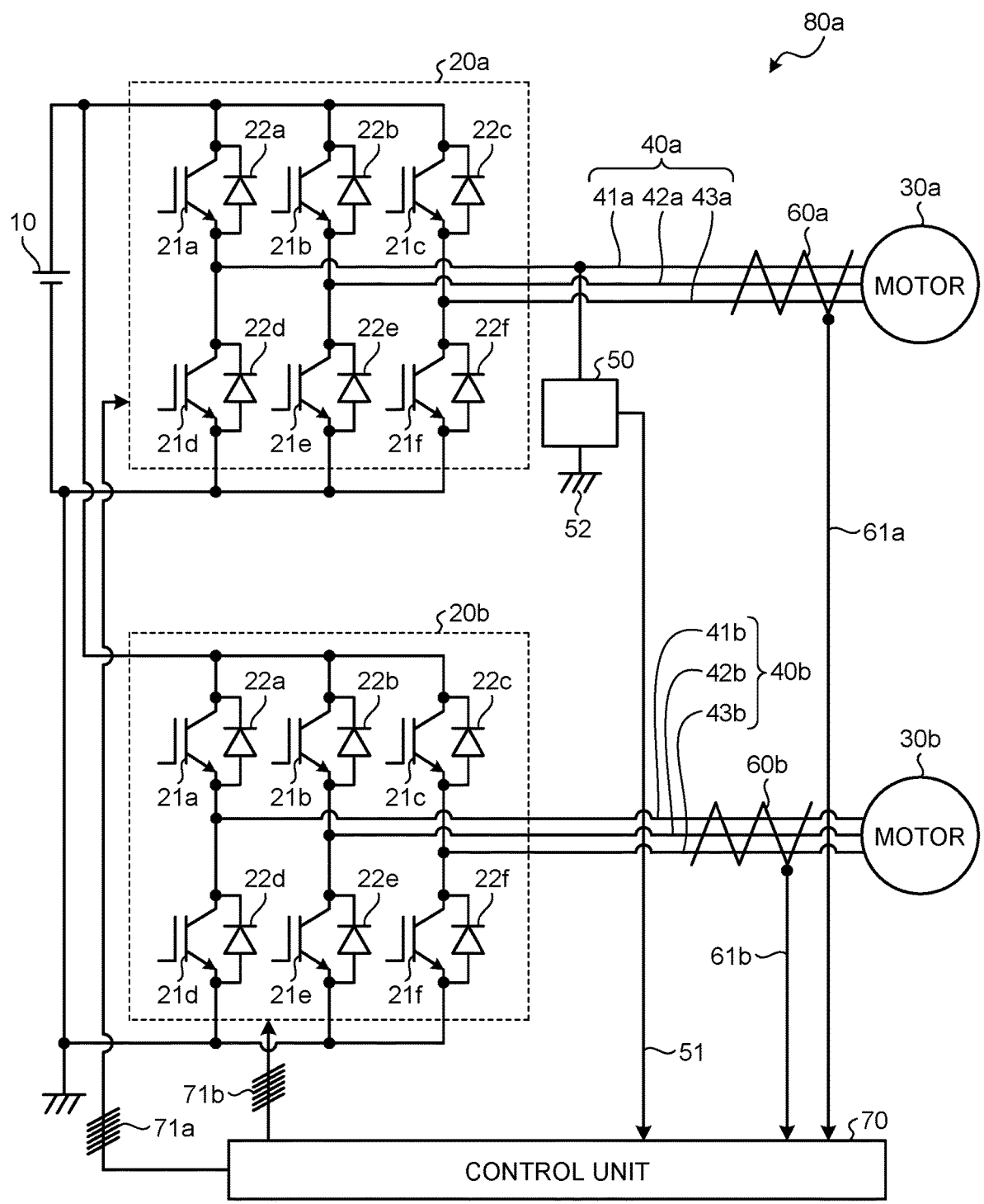
FIG. 22 is a diagram illustrating an example configuration of a motor driving apparatus according to a fifth embodiment.

FIG. 22 is a diagram illustrating an example configuration of a motor driving apparatus 80a according to the fifth embodiment. The motor driving apparatus 80a includes the direct-current power source 10, inverters 20a and 20b, motors 30a and 30b, connection line groups 40a and 40b, the voltage detection circuit 50, current detection circuits 60a and 60b, and the control unit 70. In the motor driving apparatus 80a illustrated in FIG. 22, the inverters 20a and 20b, the motors 30a and 30b, the connection line groups 40a and 40b, and the current detection circuits 60a and 60b respectively have similar configurations to the inverter 20, the motor 30, the connection line group 40, and the current detection circuit 60 of the first embodiment illustrated in FIG. 1. The inverters 20a and 20b are connected to the motors 30a and 30b by connection line groups 40a and 40b, and output three-phase alternating-current voltages to the motors 30a and 30b, respectively. The control unit 70 is a microcontroller that controls operation of the inverters 20a and 20b. Specifically, the control unit 70 generates gate signals 71a and 71b on the basis of the voltage detection result 51 and current detection results 61a and 61b, and outputs the gate signals 71a and the gate signals 71b to the inverter 20a and the inverter 20b, respectively.

Next, a description will be given of operation in which the voltage detection circuit 50 detects the first voltage and the control unit 70 calculates the direct-current bus voltage Vdc in the motor driving apparatus 80a. In the fifth embodiment, the motor driving apparatus 80a includes the inverters 20a and 20b, which are connected in parallel to the direct-current power source 10. Furthermore, the inverters 20a and 20b output three-phase alternating-current voltages to the motors 30a and 30b, respectively. In such a configuration, even if the three-phase alternating-current voltages, output frequencies, or the like output from the inverters 20a and 20b are different in the motor driving apparatus 80a, the direct-current bus voltages Vdc equal in magnitude are applied by the direct-current power source 10 to the inverters 20a and 20b.

Therefore, the control unit 70 does not need to calculate both the direct-current bus voltages Vdc output from the inverters 20a and 20b. Thus, the control unit 70 calculates the direct-current bus voltage Vdc for one of the inverters, and controls operation of the inverters 20a and 20b by using the calculated direct-current bus voltage Vdc as the direct-current bus voltage Vdc common to the inverters 20a and 20b. In the motor driving apparatus 80a, the voltage detection circuit 50 is connected to a first connection line 41a of the connection line group 40a connecting the inverter 20a and the motor 30a, and detects the first voltage for the inverter 20a. The control unit 70 calculates the direct-current bus voltage Vdc by using the first voltage. A method of calculating the direct-current bus voltage Vdc in the control unit 70 is similar to the method of calculating the direct-current bus voltage Vdc in the control unit 70 of the first embodiment.

Furthermore, the control unit 70 can also perform control as described in the first and fourth embodiments. In addition, the voltage detection circuit 50 may include the filter 58 therein as described in the second and third embodiments.

As described above, according to the present embodiment, the motor driving apparatus 80a includes a plurality of inverters and a plurality of motors. With this configuration, the motor driving apparatus 80a calculates the direct-current bus voltage Vdc by using the phase voltage of one of the inverters, and controls the inverters 20a and 20b by using the calculated direct-current bus voltage Vdc. As a result, the motor driving apparatus 80a including a plurality of inverters and a plurality of motors can achieve the effect similar to that of the first embodiment, and can detect the direct-current bus voltage Vdc with a simple configuration. Note that while the motor driving apparatus 80a is configured such that the inverters 20a and 20b, the connection line groups 40a and 40b, and the motors 30a and 30b are arranged in two parallel rows, this is just an example and the motor driving apparatus 80a may be configured such that the inverters 20a and 20b, the connection line groups 40a and 40b, and the motors 30a and 30b are arranged in three or more parallel rows. That is, the motor driving apparatus may be configured such that three or more inverters are connected in parallel.

Sixth Embodiment

An air conditioner including any of the motor driving apparatuses described in the first to fifth embodiments will be described in a sixth embodiment. Here, the motor driving apparatus 80 will be described as an example, but the motor driving apparatus 80a can also be applied to the present embodiment.

Figure 23:
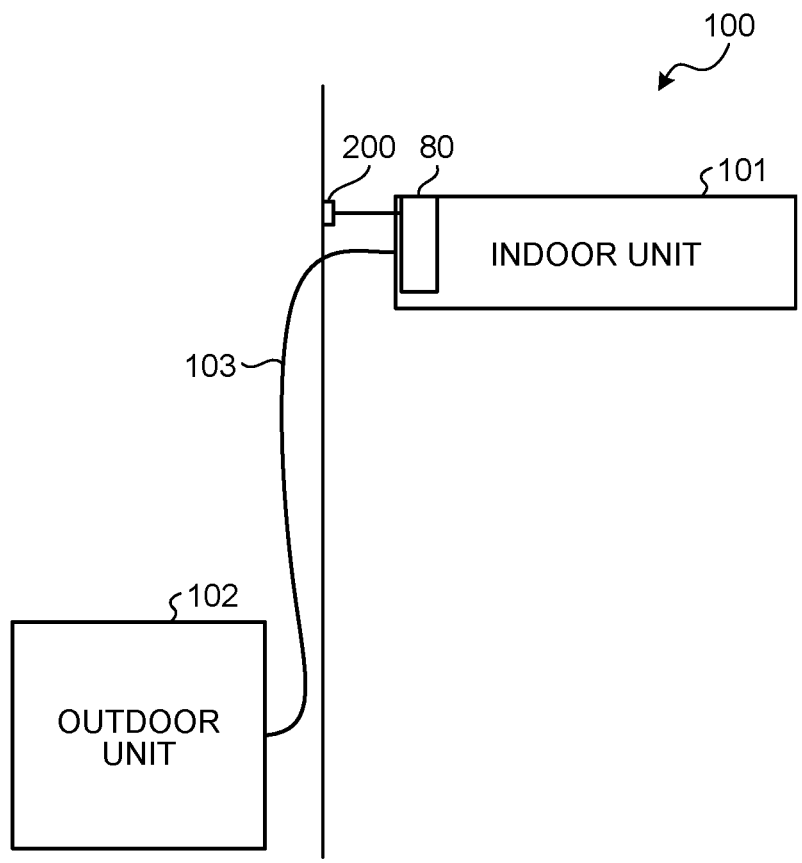
FIG. 23 is a diagram illustrating an example configuration of an air conditioner according to a sixth embodiment.

FIG. 23 is a diagram illustrating an example configuration of an air conditioner 100 according to the sixth embodiment. The air conditioner 100 includes an indoor unit 101, an outdoor unit 102, and a wire 103. The indoor unit 101 and the outdoor unit 102 are connected by the wire 103. An air conditioner installed in a house is cited as an example of the air conditioner 100. The indoor unit 101 includes the motor driving apparatus 80. The motor driving apparatus 80 is plugged into an outlet installed in a house, via a power wire 200, to be supplied with an alternating-current voltage from a commercial power source. As described above, the direct-current power source 10 can be replaced by a converter in the motor driving apparatus 80. In the motor driving apparatus 80, the converter converts the alternating-current voltage into a direct-current voltage, that is, a direct-current bus voltage.

As illustrated in FIG. 23, the indoor unit 101 of the air conditioner 100 is plugged into the outlet regardless of whether the air conditioner 100 is used, so that the motor driving apparatus 80 is supplied with the alternating-current voltage from the outlet. Here, a motor driving apparatus including a circuit that is located on the input side of an inverter and detects a direct-current bus voltage is cited as a comparative example. The circuit that detects the direct-current bus voltage is located on the input side of the inverter in the motor driving apparatus of the comparative example. Therefore, the alternating-current voltage supplied from the outlet is consumed by a resistor for detecting the direct-current bus voltage, and power consumption is constantly caused. When the air conditioner is not operating, power consumed by the resistor corresponds to standby power. As long as the indoor unit is plugged into the outlet, the alternating-current voltage is applied to the motor driving apparatus to generate standby power.

In the present embodiment, the air conditioner 100 includes the voltage detection circuit 50 for detecting the direct-current bus voltage, the voltage detection circuit 50 being located on the output side of the inverter 20 of the indoor unit 101. A current flows through the voltage detection circuit 50 only when a voltage is output from the inverter 20, and no current flows when no voltage is output from the inverter 20. With such a configuration, the motor driving apparatus 80 can reduce standby power in the voltage detection circuit 50 even when plugged into the outlet, by detecting the direct-current voltage only when the inverter 20 is operating.

Note that in the motor driving apparatus 80, the voltage detection circuit 50 is connected only to the first connection line 41 in the connection line group 40 between the inverter 20 and the motor 30. That is, in the motor driving apparatus 80, a resistor is connected to one of the three connection lines of the connection line group 40, and no resistor is connected to the other two connection lines. In this case, in the motor driving apparatus 80, imbalance is caused in a current flowing from the inverter 20 to the motor 30, so that there is a concern that noise may be generated in the motor 30. Therefore, the motor driving apparatus 80 includes resistors having the same resistance value as the resistance value of the voltage-dividing resistor used in the voltage detection circuit 50. The resistors are connected to the two of the three connection lines of the connection line group 40, that is, the second connection line 42 and the third connection line 43 that are not connected to the voltage detection circuit 50. As a result, the motor driving apparatus 80 can prevent the imbalance in the current flowing to the motor 30, and can prevent noise caused by the motor 30.

It is possible to reduce power consumption by increasing the resistance value of the voltage-dividing resistor included in the voltage detection circuit 50 so as to reduce power consumption in the voltage detection circuit 50. However, if the resistance of the voltage-dividing resistor included in the voltage detection circuit 50 is excessively increased, a current flowing to the voltage detection circuit 50 decreases, so that the voltage detection circuit 50 is easily affected by noise such as a surge that occurs in the motor driving apparatus 80. Therefore, the voltage detection circuit 50 may include a 5-V power source and two clamp diodes located between the 5-V power source and the ground 52 so as to prevent malfunction due to noise such as a surge.

Figure 24:
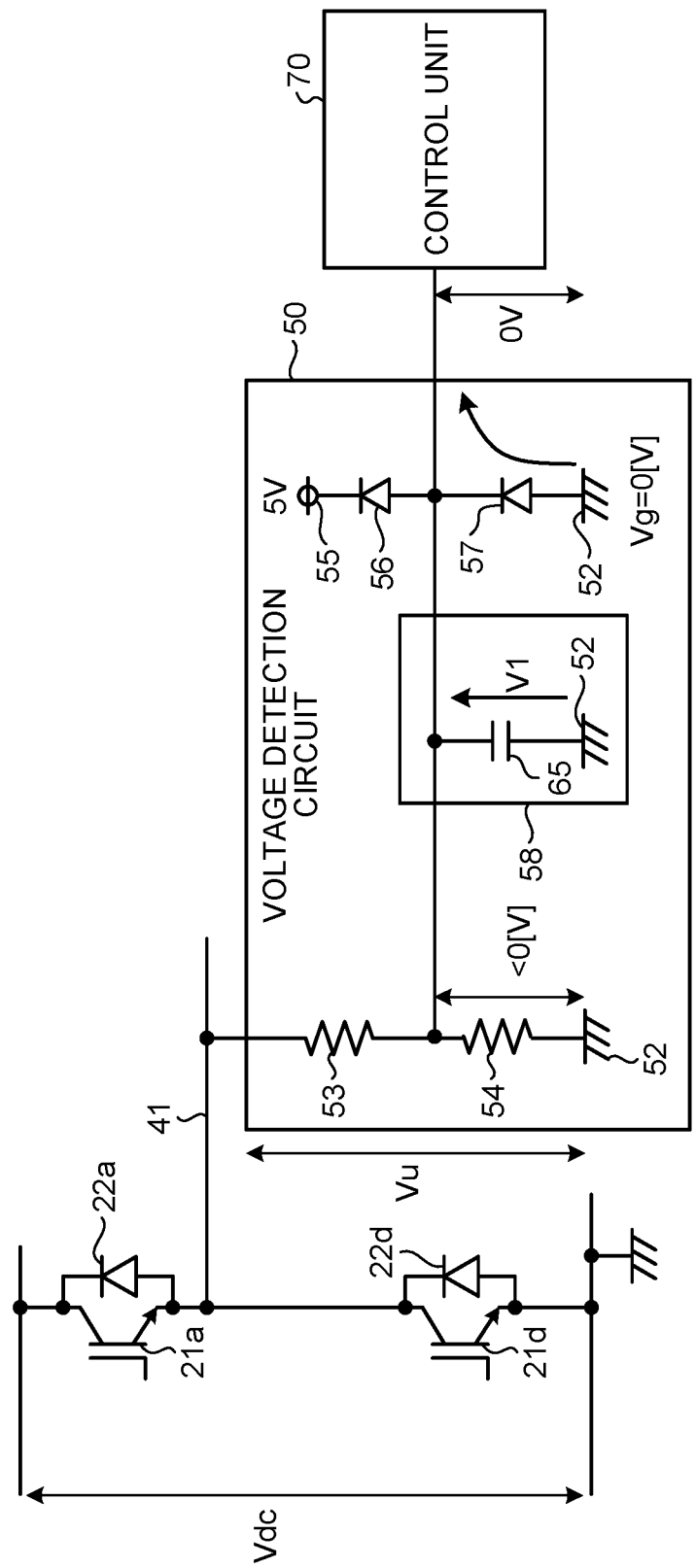
FIG. 24 is a diagram illustrating an example in which a voltage of 0 V is output to a control unit in a voltage detection circuit of a motor driving apparatus according to the sixth embodiment.
Figure 25:
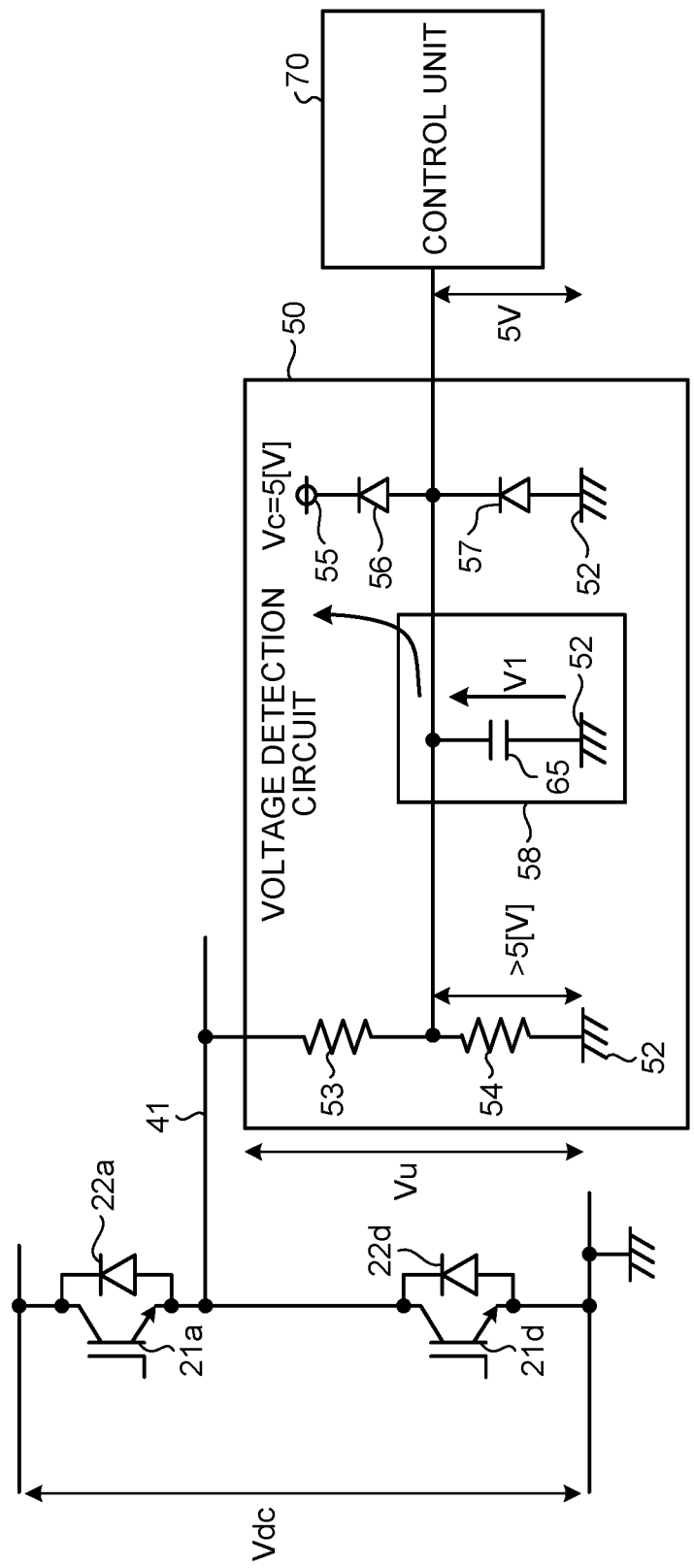
FIG. 25 is a diagram illustrating an example in which a voltage of 5 V is output to the control unit in the voltage detection circuit of the motor driving apparatus according to the sixth embodiment.

FIG. 24 is a diagram illustrating an example in which a voltage of 0 V is output to the control unit 70 in the voltage detection circuit 50 of the motor driving apparatus 80 according to the sixth embodiment. Furthermore, FIG. 25 is a diagram illustrating an example in which a voltage of 5 V is output to the control unit 70 in the voltage detection circuit 50 of the motor driving apparatus 80 according to the sixth embodiment. The voltage detection circuit 50 of the sixth embodiment illustrated in FIGS. 24 and 25 is obtained by addition of a 5-V power source 55 and clamp diodes 56 and 57 to the voltage detection circuit 50 of the second embodiment illustrated in FIG. 15. The 5-V power source 55 is a direct-current power source that outputs a direct-current voltage of 5 V. As illustrated in FIGS. 24 and 25, a connection line connecting the two clamp diodes 56 and 57 is connected to a connection line connecting the resistors 53 and 54 used for the voltage-dividing resistor with the control unit 70, in the voltage detection circuit 50. As illustrated in FIG. 24, when the first voltage V1, which is the voltage across the resistor 54 of the voltage-dividing resistor, is lower than 0 V, the first voltage V1 is lower than the voltage of the ground 52, that is, a voltage Vg=0 V. In this case, the voltage detection circuit 50 outputs, to the control unit 70, the voltage supplied from the ground 52 side, that is, outputs the voltage detection result 51 of the voltage Vg=0 V. Furthermore, as illustrated in FIG. 25, when the first voltage V1, which is the voltage across the resistor 54 of the voltage-dividing resistor, is higher than 5 V, the first voltage V1 is higher than the output voltage of the 5-V power source 55, that is, an output voltage Vc=5 V. In this case, the voltage detection circuit 50 outputs, to the control unit 70, the voltage supplied from the 5-V power source 55 side, that is, outputs the voltage detection result 51 of the voltage Vc=5 V. As a result, the voltage detection circuit 50 can maintain the voltage value to be output to the control unit 70, that is, the voltage detection result 51 within a range from 0 V to 5 V inclusive.

Here, if the impedance of the voltage-dividing resistor of the voltage detection circuit 50 is too low, the voltage detection circuit 50 is affected by the winding impedance of the motor 30. Therefore, the resistance value of the voltage-dividing resistor of the voltage detection circuit 50 is set to a value of about 100 times, for example 80 to 120 times, the resistance value of the winding of the motor 30.

The configurations described in the above embodiments each illustrate an example of the subject matter of the present invention, and it is possible to combine each configuration with another technique that is publicly known, and is also possible to make omissions and changes to part of each configuration without departing from the gist of the present invention.

The invention claimed is:

1. A motor driving apparatus for driving a motor, the motor driving apparatus being connected to the motor by a first connection line, a second connection line, and a third connection line, the first connection line, the second connection line, and the third connection line respectively corresponding to a first phase, a second phase, and a third phase, the motor driving apparatus comprising:
    an inverter comprising a first switching element pair, a second switching element pair, and a third switching element pair respectively connected to the first connection line, the second connection line, and the third connection line, each of the first switching element pair, the second switching element pair, and the third switching element pair comprising an upper-arm switching element and a lower-arm switching element, the inverter converting a direct-current voltage into a three-phase alternating-current voltage by using the first switching element pair, the second switching element pair, and the third switching element pair and outputting the three-phase alternating-current voltage to the motor;
    a voltage detection circuit detecting a first voltage, the first voltage being based on a potential difference between a potential of the first connection line and a reference potential; and
    a control unit calculating a voltage value of the direct-current voltage on a basis of the first voltage during a first period, controlling an operation of the inverter in accordance with the voltage value, and changing the first period in accordance with the voltage value, the upper-arm switching element of the first switching element pair being in an on-state during the first period.

2. The motor driving apparatus according to claim 1, wherein
    the control unit comprises:
    a voltage command value calculation unit calculating a voltage command value on a basis of the voltage value;
    a gate signal generation unit generating a gate signal for controlling the operation of the inverter on a basis of the voltage command value, and outputting the gate signal to the inverter; and
    a voltage modulation factor control unit comparing a voltage modulation factor of the inverter with a voltage modulation factor threshold value, making no change to a length of the first period when the voltage modulation factor is less than the voltage modulation factor threshold value, and instructing the voltage command value calculation unit to increase the length of the first period such that the first period becomes longer than a period to be originally obtained on a basis of the voltage modulation factor when the voltage modulation factor is equal to or greater than the voltage modulation factor threshold value, the voltage modulation factor being obtained on a basis of the voltage command value.

3. The motor driving apparatus according to claim 2, wherein
    when the voltage modulation factor is equal to or greater than the voltage modulation factor threshold value, the voltage modulation factor control unit instructs the voltage command value calculation unit to increase lengths of a second period and a third period such that the second period and the third period become longer than the period to be originally obtained on a basis of the voltage modulation factor, the second period being a period in which the upper-arm switching element of the second switching element pair is in the on-state, the third period being a period in which the upper-arm switching element of the third switching element pair is in the on-state.

4. The motor driving apparatus according to claim 1, wherein
the voltage detection circuit comprises:
a voltage-dividing resistor provided between the first connection line and a ground that is the reference potential, the voltage-dividing resistor comprising a first resistor and a second resistor; and
a filter with one end connected to a first wire and another end connected to the ground, the one end and the first wire being connected at a second connecting point, the first wire connecting a first connecting point and the control unit, the first connecting point being a connecting point of the first resistor and the second resistor, and
a resistance value of the first resistor, a resistance value of the second resistor, and a capacitance of the filter are set such that a time constant is smaller than the first period, the time constant being calculated on a basis of the resistance value of the first resistor or the resistance value of the second resistor, and the capacitance of the filter.

5. The motor driving apparatus according to claim 4, wherein
the voltage detection circuit comprises
a third resistor with one end connected to the first connecting point and an another end connected to the second connecting point on the first wire.

6. The motor driving apparatus-according to claim 4, wherein
the voltage detection circuit comprises a direct-current power source and two clamp diodes, the two clamp diodes being located between the direct-current power source and the ground, and
a second wire connecting the two clamp diodes is connected to the first wire at a point between the second connecting point and the control unit such that a voltage to be output from the voltage detection circuit to the control unit is not less than 0 and not more than an output voltage value of the direct-current power source.

7. The motor driving apparatus according to claim 4, wherein
the resistance value of the voltage-dividing resistor is set to a value that is 80 to 120 times a resistance value of a winding resistor of the motor.

8. The motor driving apparatus according to claim 4, wherein
the control unit estimates the first voltage detected by the voltage detection circuit, by using the time constant on a basis of a voltage value detected after elapse of a fourth period from input of the first voltage.

9. The motor driving apparatus according to claim 1, comprising:
a plurality of the inverters each connected to different one of a plurality of the motors by the first connection line, the second connection line, and the third connection line, each of the inverters outputting a three-phase alternating-current voltage to the different one of the motors when the inverters drive the motors, wherein
the voltage detection circuit is connected to one of a plurality of the first connection lines, and detects the first voltage, and
the control unit treats the calculated voltage value as a voltage value of a direct-current voltage common to the inverters, and controls operation of the inverters in accordance with the voltage value.

10. An air conditioner comprising the motor driving apparatus according to claim 1.

* * * * *